(12) United States Patent
Kim et al.

(10) Patent No.: US 11,217,164 B2
(45) Date of Patent: Jan. 4, 2022

(54) SIGNAL PROCESSING DEVICE AND IMAGE DISPLAY APPARATUS INCLUDING THE SAME

(71) Applicant: LG ELECTRONICS INC., Seoul (KR)

(72) Inventors: Hansoo Kim, Seoul (KR); Jeonghyu Yang, Seoul (KR); Saem Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/840,259

(22) Filed: Apr. 3, 2020

(65) Prior Publication Data

US 2020/0372860 A1 Nov. 26, 2020

(30) Foreign Application Priority Data

Apr. 4, 2019 (KR) .................. 10-2019-0039650

(51) Int. Cl.
  *G09G 5/10* (2006.01)
  *G09G 3/3233* (2016.01)
  *H04N 5/57* (2006.01)

(52) U.S. Cl.
  CPC .............. *G09G 3/3233* (2013.01); *H04N 5/57* (2013.01); *G09G 2320/029* (2013.01);
  (Continued)

(58) Field of Classification Search
  CPC .. G09G 3/3233; G09G 3/2074; G09G 3/3208; G09G 3/2003; G09G 2320/0686; G09G 2320/0257; G09G 2320/043; G09G 2320/0626; G09G 2320/066; G09G 2320/029; G09G 2360/16; G09G 2300/0842
  (Continued)

(56) References Cited

U.S. PATENT DOCUMENTS

| | | | |
|---|---|---|---|
| 2010/0103198 A1* | 4/2010 | Polak | G09G 3/30 345/690 |
| 2014/0146071 A1* | 5/2014 | Kim | G09G 3/3225 345/589 |

(Continued)

FOREIGN PATENT DOCUMENTS

| | | |
|---|---|---|
| EP | 3454323 | 3/2019 |
| KR | 1020190017273 | 2/2019 |

OTHER PUBLICATIONS

European Patent Office Application Serial No. 20168000.6, Search Report dated Jul. 15, 2020, 8 pages.

*Primary Examiner* — Jennifer T Nguyen
(74) *Attorney, Agent, or Firm* — Lee Hong Degerman Kang & Waimey

(57) ABSTRACT

An image display apparatus is disclosed. The image display apparatus includes a current calculator configured to calculate pixel current of an input image, an accumulated current calculator configured to calculate accumulated current of the input image, and an afterimage reducer configured to output a second brightness level less than a brightness level of the input image with respect to a detection region if a level of the accumulated current is equal to or greater than a reference value. Thus, the lifespan of an image display apparatus including an organic light emitting diode panel is increased.

20 Claims, 26 Drawing Sheets

(52) U.S. Cl.
CPC .............. *G09G 2320/0257* (2013.01); *G09G 2320/043* (2013.01); *G09G 2320/066* (2013.01); *G09G 2320/0626* (2013.01); *G09G 2320/0686* (2013.01)

(58) Field of Classification Search
USPC ............................................ 345/76, 690–694
See application file for complete search history.

(56) References Cited

U.S. PATENT DOCUMENTS

| | | |
|---|---|---|
| 2014/0160142 A1 | 6/2014 | Lee et al. |
| 2017/0116915 A1* | 4/2017 | Song ........................ G09G 3/20 |
| 2020/0074708 A1* | 3/2020 | Park ..................... G09G 3/3233 |

\* cited by examiner

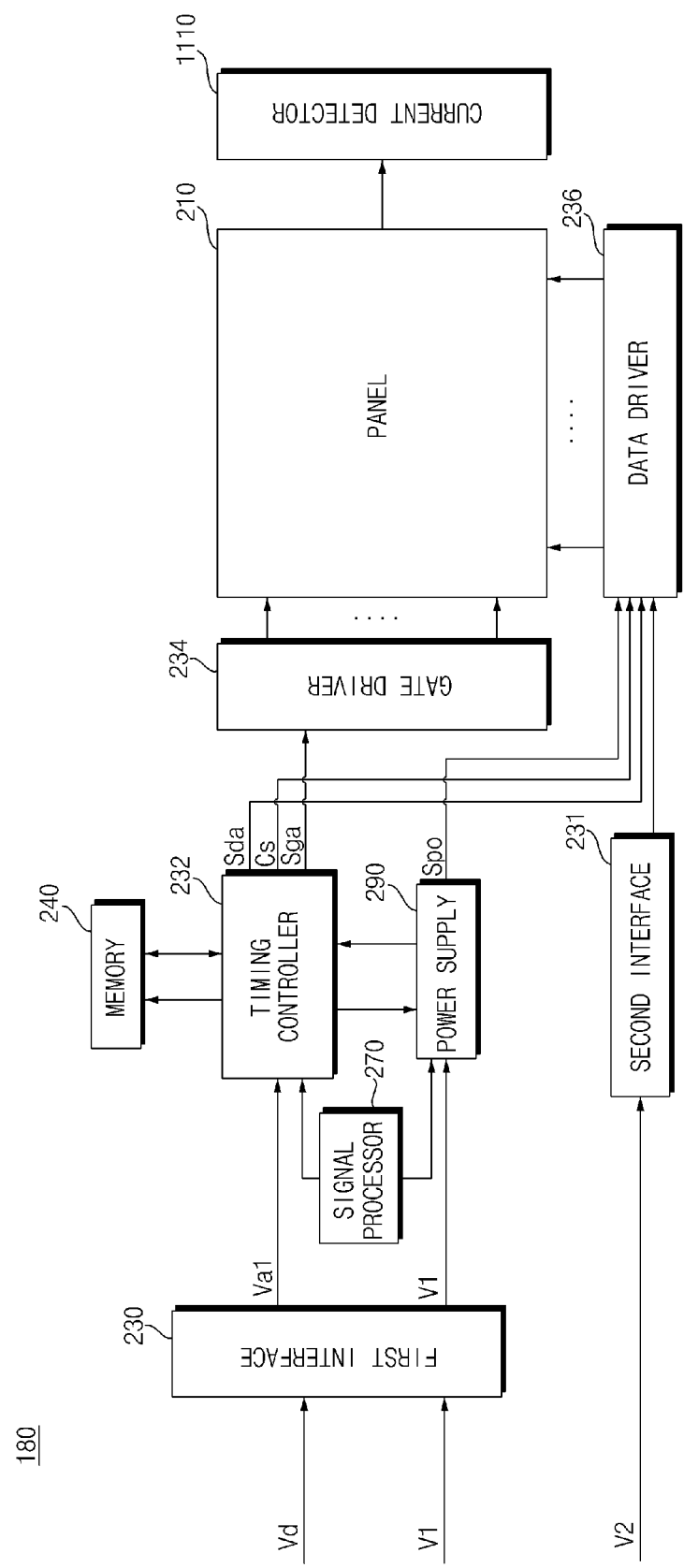

SIGNAL PROCESSING DEVICE AND IMAGE DISPLAY APPARATUS INCLUDING THE SAME

CROSS-REFERENCE TO THE RELATED APPLICATIONS

Pursuant to 35 U.S.C. § 119(a), this application claims the benefit of earlier filing date and right of priority to Korean Patent Application No. 10-2019-0039650, filed on Apr. 4, 2019, the contents of which are all hereby incorporated by reference herein in its entirety.

BACKGROUND OF THE INVENTION

1. Field of the Invention

The present disclosure relates to an image display apparatus, and more particularly, to a signal processing device and an image display apparatus including the same for increasing the lifespan of an image display apparatus including an organic light emitting diode panel.

2. Description of the Related Art

A signal processing device is a device that is included in an image display apparatus and performs signal processing on an input image so as to display an image.

For example, the signal processing device may receive a broadcast signal or an HDMI signal, performs signal processing based on the received broadcast or HDMI signal, and output a processed image signal.

The image display apparatus is a device having a function of providing an image that a user watches. The user may watch various images through the image display apparatus.

In particular, the image display apparatus may display a broadcast image. The image display apparatus may provide broadcasting selected by the user from a broadcast signal transmitted from a broadcast station and may display such a broadcast image on a display.

The image display apparatus may include various types of panels and may display an image. Recently, an organic light emitting diode panel having a rapid response speed and vivid image quality has been increasingly employed by an image display apparatus.

Due to device characteristics, a burn-in phenomenon occurs in the organic light emitting diode panel. In particular, when a specific region in an image is repeatedly displayed, burn-in whereby a portion of a light emitting diode which corresponds to the corresponding region may easily occur.

For example, when a broadcasting image is displayed, the possibility that burn-in occurs at a position of a broadcast station name, a program title, or the like of a channel is increased. Thus, research has been conducted into various methods for reducing burn-in.

In Korean Patent Publication No. 10-2013-0112178, an organic light emitting display apparatus detects a point, at which an afterimage is formed, based on an input image itself, and thus, detection accuracy is degraded and it is not easy to detect a translucent logo but not a transparent logo, and accordingly, there is a problem in that burn-in occurs in a region of a translucent logo, or the like.

SUMMARY OF THE INVENTION

Therefore, the present disclosure has been made in view of the above problems, and it is an object of the present disclosure to provide an image display apparatus for increasing the lifespan of an image display apparatus including an organic light emitting diode panel.

It is another object of the present disclosure to provide an image display apparatus for performing an operation of reducing an afterimage by detecting a translucent logo region.

In accordance with the present disclosure, the above and other objects can be accomplished by the provision of a signal processing device including a current calculator configured to calculate pixel current of an input image, an accumulated current calculator configured to calculate accumulated current of the input image, and an afterimage reducer configured to output a second brightness level less than a brightness level of the input image with respect to a detection region if a level of the accumulated current is equal to or greater than a reference value.

The current calculator may calculate subpixel current of subpixels, adds the subpixel current, and may output pixel current.

The accumulated current calculator may accumulate the pixel current from the current calculator and may calculate accumulated current of regions including a pixel.

The afterimage reducer may vary contrast to decrease a difference from a surrounding region of the detection region.

The signal processing device may further include a gain map generator configured to generate a gain map including a gain set based on the accumulated current.

The afterimage reducer varies brightness and contrast of the input image based on a gain in the gain map.

The afterimage reducer may vary brightness and contrast of the input image in inverse proportion to the gain of the gain map.

The current calculator may include a grayscale converter configured to convert the input image data into grayscale data, a plurality of subpixel current calculators configured to calculate subpixel current of subpixel data from the grayscale converter, and an adder configured to add subpixel current from the plurality of subpixel current calculators and to output pixel current.

The accumulated current calculator may include a region accumulator configured to calculate the accumulated region current based on the pixel current from the current calculator, and a filter configured to perform filtering on the accumulated region current.

The gain map generator may include a scaler configured to upscale the accumulated region current to accumulated pixel current.

The gain map generator may further include a lookup table configured to set a gain corresponding to the accumulated pixel current, and the gain map may be generated based on the set gain.

The scaler may perform the upscaling to decrease a current difference between the detection region and a surrounding region around the detection region in units of pixels than a current difference between regions.

The afterimage reducer may include a brightness reducer configured to reduce brightness of the detection region based on a gain corresponding to accumulated pixel current.

The afterimage reducer may further include a contrast reducer configured to reduce a contrast difference between the detection region and a surrounding region around the detection region based on a gain corresponding to accumulated pixel current.

The detection region may include a translucent logo region or a test region, and the afterimage reducer may perform control to decrease brightness of the detection region compared with the input image.

The afterimage reducer may perform control to decrease brightness of a surrounding region around the detection region compared with the input image.

The afterimage reducer may perform control to decrease a difference between a brightness level of the input image and the second brightness level as a brightness level of the input image corresponding to the detection region decreases, and may perform control to increase the difference between the brightness level of the input image and the second brightness level as the brightness level of the input image corresponding to the detection region increases.

The afterimage reducer may perform control to increase an inclination as an input brightness level is lowered and to reduce the inclination as the input brightness level is increased compared with a brightness level of the input image in a plot of the second brightness level.

The afterimage reducer may vary brightness in the detection region using a gain for each subpixel of the input image and a frame gain.

In accordance with another aspect of the present disclosure, a signal processing device and an image display apparatus including the same includes a current calculator configured to calculate pixel current of an input image, an accumulated current calculator configured to calculate accumulated current of the input image, and an afterimage reducer configured to vary contrast with respect to a detection region if a level of the accumulated current is equal to or greater than a reference value, wherein the afterimage reducer performs control to decrease brightness with respect to a first pixel of the detection region, which is brighter than the surrounding region of the detection region, and performs control to increase brightness with respect to a second pixel of the detection region, which is darker than the surrounding region of the detection region.

BRIEF DESCRIPTION OF THE DRAWINGS

The above and other objects, features and other advantages of the present disclosure will be more clearly understood from the following detailed description taken in conjunction with the accompanying drawings, in which:

FIG. 5 is an internal block diagram of a display of FIG. 2;

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
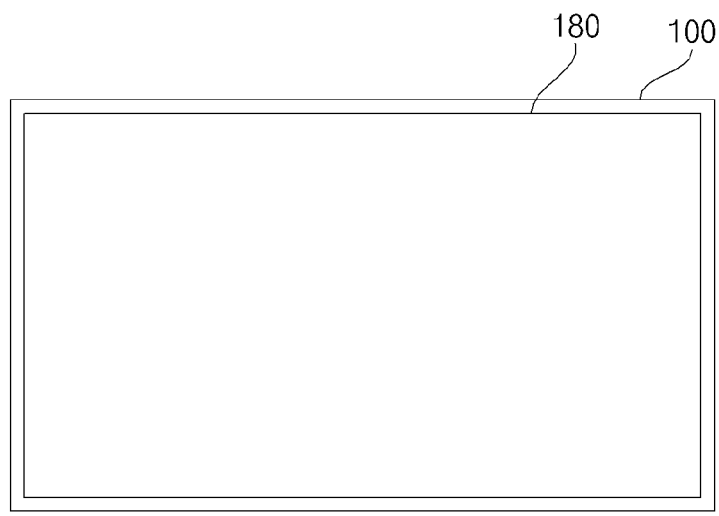
FIG. 1 is a diagram showing an image display system according to an embodiment of the present disclosure.

FIG. 1 is a diagram showing an image display apparatus according to an embodiment of the present disclosure.

Referring to the drawing, an image display apparatus 100 may include a display 180.

The display 180 may be implemented with any one of various panels. For example, the display 180 may be any one of a liquid crystal display panel (LCD panel), an organic light emitting diode panel (OLED panel), an inorganic light emitting diode panel (LED panel).

In the present disclosure, an example in which the display 180 includes the organic light emitting diode panel (OLED panel) is mainly described.

Meanwhile, the OLED panel exhibits a faster response speed than the LED and is excellent in color reproduction.

The present disclosure may propose a method of increasing the lifespan of an image display apparatus by reducing burn-in that may occur in an organic light emitting diode (OLED) panel included in the display 180.

In particular, the present disclosure may propose a method of increasing the lifespan of an organic light emitting diode (OLED) panel by performing an operation of reducing an afterimage by detecting a translucent logo region.

The image display apparatus 100 according to an embodiment of the present disclosure may include a current calculator 1010 for calculating pixel current of an input image, an accumulated current calculator 1020 for calculating accumulated current of the input image, and an afterimage reducer 1040 for outputting a second brightness level lower than a brightness level of the input image with respect to a detection region if a level of the accumulated current is equal to or greater than a reference value. Thus, the lifespan of the image display apparatus including an organic light emitting diode panel may be increased. In particular, an operation of reducing an afterimage by detecting a translucent logo region may be performed, and thus, the lifespan of the image display apparatus may be increased.

A brightness level may be lowered in units of pixels in a detection region, and thus, the brightness of an entire image may be enhanced compared with the prior art.

The afterimage reducer 1040 according to an embodiment of the present disclosure may vary contrast to reduce a difference of a detection region from a region around. Thus, the contrast difference due to reduction in brightness around the detection region may be lowered.

The image display apparatus 100 according to another embodiment of the present disclosure may include the current calculator 1010 for calculating pixel current of an input image, the accumulated current calculator 1020 for calculating accumulated current of the input image, and the afterimage reducer 1040 for varying contrast with respect to a detection region if a level of the accumulated current is equal to or greater than a reference value, and the afterimage reducer 1040 may perform to reduce brightness with respect to a first pixel of the detection region, which is brighter than the region around the detection region, and may perform control to increase brightness with respect to a second pixel of the detection region, which is darker than the region around the detection region. Thus, the lifespan of an image display apparatus including an organic light emitting diode panel may be increased. In particular, the contrast difference due to reduction in brightness around the detection region may be lowered.

Various operating methods of the aforementioned image display apparatus 100 will be described in more detail with reference to FIG. 9 and subsequent drawings thereof.

Meanwhile, the image display apparatus 100 in FIG. 1 may be a monitor, a TV, a tablet PC, a mobile terminal, a display for a vehicle, etc.

Figure 2:
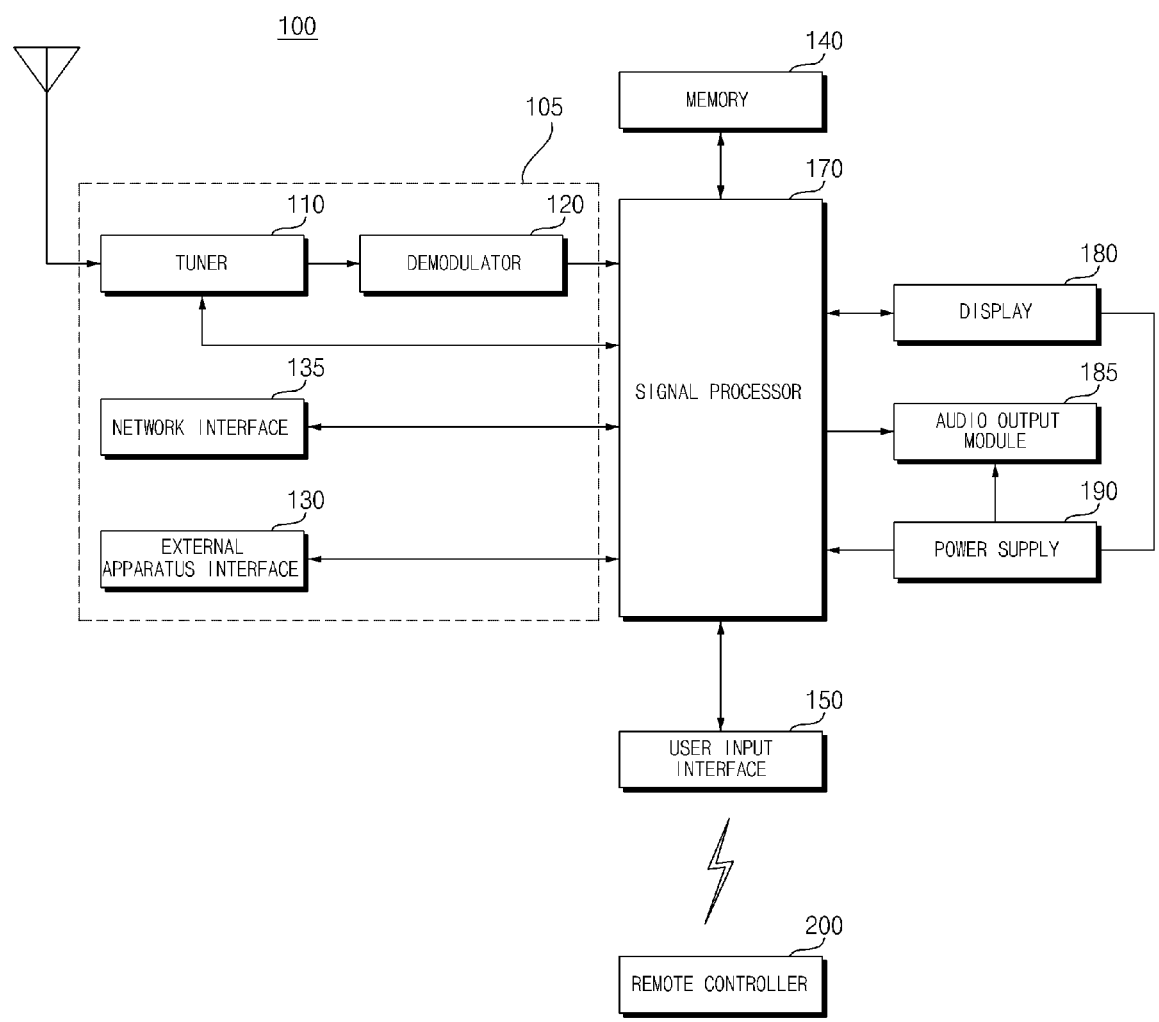
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor unit (not shown), a signal processor 170, a display 180, and an audio output module 185.

The image receiver 105 may include a tuner 110, a demodulator 120, a network interface 135, and an external apparatus interface 130.

Meanwhile, unlike the drawing, the image receiver 105 may include only the tuner 110, the demodulator 120, and the external apparatus interface 130. That is, the network interface 135 may not be included.

The tuner 110 selects an RF broadcast signal corresponding to a channel selected by a user or all prestored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processor 170.

Meanwhile, the tuner 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output module 185.

The external apparatus interface 130 may transmit or receive data with a connected external apparatus (not shown), e.g., a settop box 50. To this end, the external apparatus interface 130 may include an A/V input and output module (not shown).

The external apparatus interface 130 may be connected in wired or wirelessly to an external apparatus such as a digital versatile disk (DVD), a Blu ray, a game equipment, a camera, a camcorder, a computer (note book), and a settop box, and may perform an input/output operation with an external apparatus.

The A/V input and output module may receive image and audio signals from an external apparatus. Meanwhile, a wireless communicator (not shown) may perform short range wireless communication with other electronic apparatus.

Through the wireless communicator (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the signal processor 170, and may store signal processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor unit (not shown) that senses a user's gesture to the signal processor 170, or may transmit a signal from the signal processor 170 to the sensor unit (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output module 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processor 170 may recognize the position of the user based on the image photographed by a photographing unit (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output module 185 receives a signal processed by the signal processor 170 and outputs it as an audio.

The photographing unit (not shown) photographs a user. The photographing unit (not shown) may be implemented by a single camera, but the present disclosure is not limited thereto and may be implemented by a plurality of cameras. Image information photographed by the photographing unit (not shown) may be input to the signal processor 170.

The signal processor 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output module 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
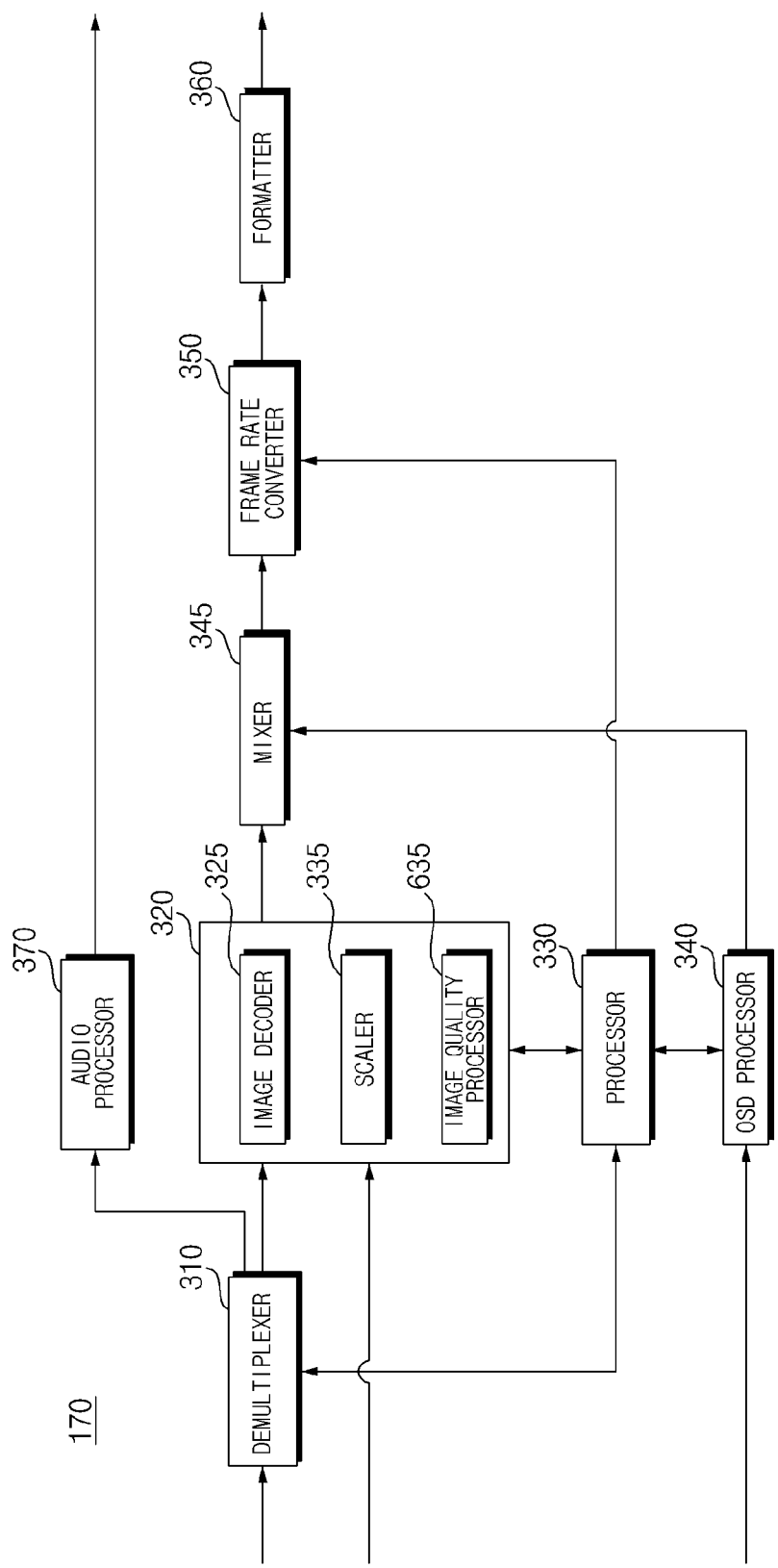
FIG. 3 is an example of an internal block diagram of the signal processor in FIG. 2.

FIG. 3 is an example of an internal block diagram of the signal processor in FIG. 2.

Referring to the drawing, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform signal processing based on high dynamic range (HDR), change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various pieces of information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

A frame rate converter (FRC) 350 may convert a frame rate of an input image. The FRC 350 may output the input image without changes.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
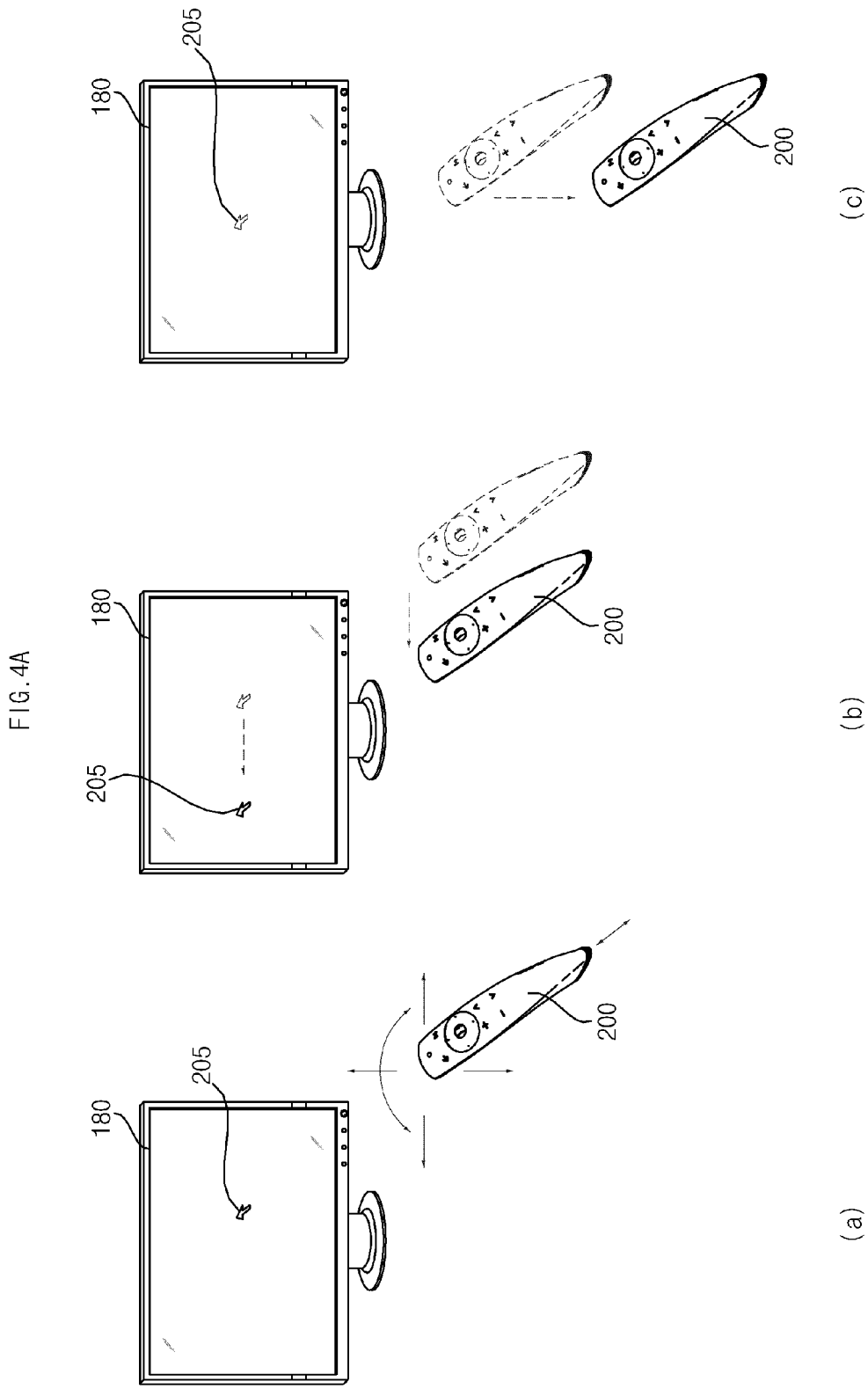
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
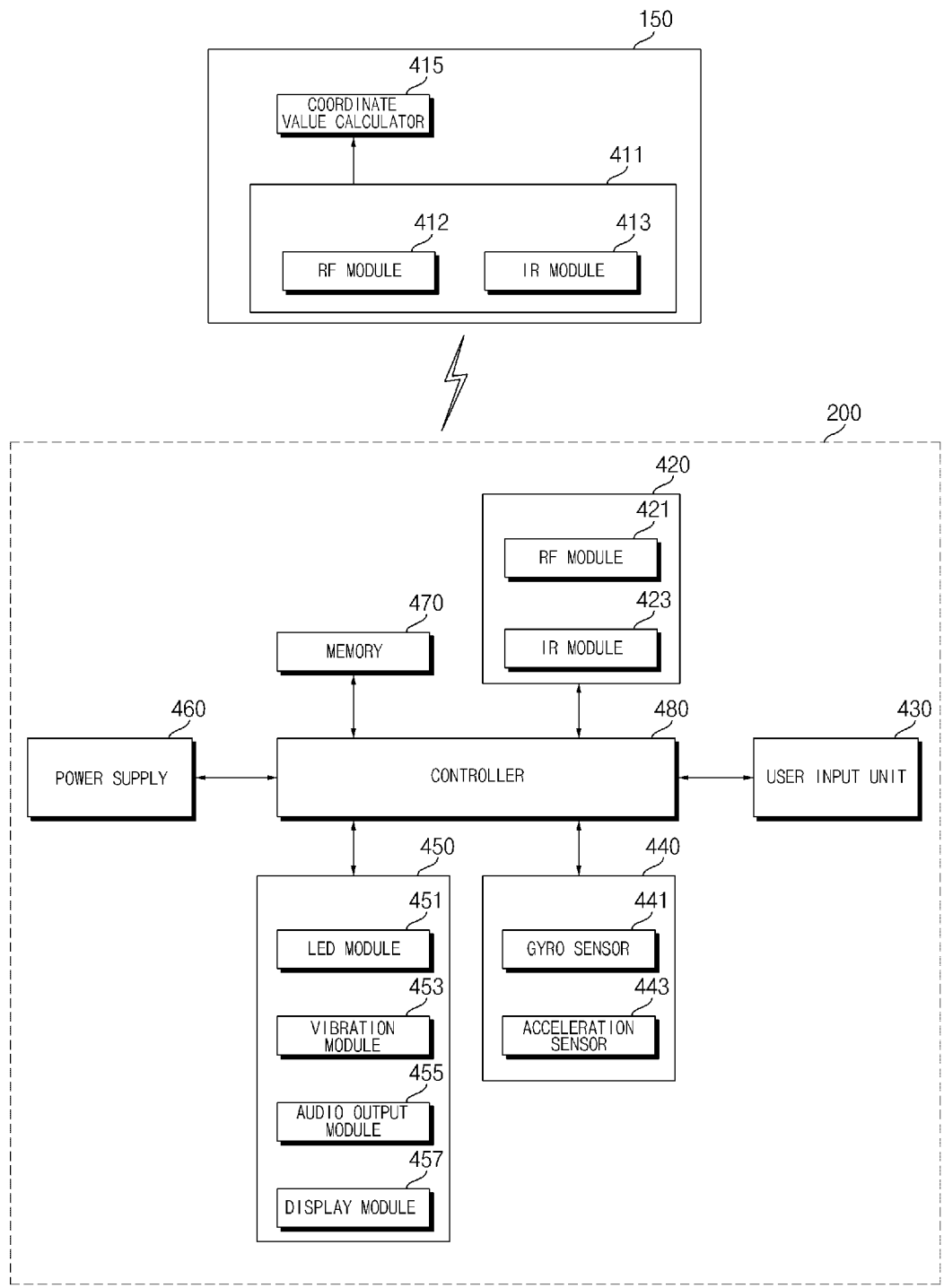
FIG. 4B is an internal block diagram of the remote controller of FIG. 2.

FIG. 4B is an internal block diagram of the remote controller of FIG. 2.

Referring to the drawing, the remote controller 200 includes a wireless communicator 425, a user input unit 435, a sensor unit 440, an output unit 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input unit 435 may be implemented by a keypad, a button, a touch pad, a touch screen, or the like. The user may operate the user input unit 435 to input a command related to the image display apparatus 100 to the remote controller 200. When the user input unit 435 includes a hard key button, the user can input a command related to the image display apparatus 100 to the remote controller 200 through a push operation of the hard key button. When the user input unit 435 includes a touch screen, the user may touch a soft key of the touch screen to input the command related to the image display apparatus 100 to the remote controller 200. In addition, the user input unit 435 may include various types of input means such as a scroll key, a jog key, etc., which can be operated by the user, and the present disclosure does not limit the scope of the present disclosure.

The sensor unit 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 435 or a signal transmitted from the image display apparatus 100. Through the output unit 450, the user may recognize whether the user input unit 435 is operated or whether the image display apparatus 100 is controlled.

For example, the output unit 450 may include an LED module 451 that is turned on when the user input unit 435 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input unit 435 or a signal corresponding to the motion of the remote controller 200 sensed by the sensor unit 440 to the image display apparatus 100 through the wireless communicator 425.

The user input interface 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless communicator 151 and may calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processor 170, not in the user input interface 150.

FIG. 5 is an internal block diagram of a display of FIG. 2.

Referring to FIG. 5, the organic display 180 including light emitting diode panel may include an organic light emitting diode panel 210, a first interface 230, a second interface 231, a timing controller 232, a gate driver 234, a data driver 236, a memory 240, a signal processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal val, the timing controller 232 may output the data driving signal Sda and the gate driving signal Sga based on the converted image signal val.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

A current detector 1110 may detect the current flowing in a subpixel of the organic light emitting diode panel 210. The detected current may be input to the processor 270 or the like, for a accumulated current calculation.

The signal processor 270 may perform each type of control of the display 180. For example, the processor 270 may control the gate driver 234, the data driver 236, the timing controller 232, and the like.

Meanwhile, the signal processor 270 may receive current information flowing in a subpixel of the organic light emitting diode panel 210 from the current detector 510.

In addition, the signal processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the signal processor 270 may determine as burn-in, if the accumulated current of each subpixel of the organic light emitting diode panel 210 is equal to or greater than an allowable value.

For example, if the accumulated current of each subpixel of the OLED panel 210 is equal to or higher than 300,000 A, the signal processor 270 may determine that a corresponding subpixel is a burn-in subpixel.

Meanwhile, if the accumulated current of each subpixel of the OLED panel 210 is close to an allowable value, the signal processor 270 may determine that a corresponding subpixel is a subpixel expected to be burn in.

Meanwhile, based on a current detected by the current detector 510, the signal processor 270 may determine that a subpixel having the greatest accumulated current is an expected burn-in subpixel.

The signal processor 270 may calculate a burn-in subpixel or a burn-in expected subpixel in the organic light emitting diode panel 210 based on current detected by the current detector 1110 and may perform control to allow a lower amount of current than allocated current to flow in a subpixel around the calculated burn-in subpixel or burn-in expected subpixel. Thus, burn-in of the subpixel around the burn-in subpixel may be extended. As a result, the lifespan of the image display apparatus 100 including the organic light emitting diode panel 210 may be increased.

The signal processor 270 may perform control to allow a larger amount of current than allocated current to flow in the calculated burn-in subpixel, and thus, thereby preventing a phenomenon in which a low amount of current flows around the calculated burn-in subpixel and brightness is lowered.

When burn-in does not occur in the organic light emitting diode panel 210, the signal processor 270 may perform control to allow a lower amount of current than allocated current to flow in the subpixel around the burn-in expected subpixel, in which burn-in is expected, and thus, burn-in of the subpixel around the burn-in expected subpixel may be extended. As a result, the lifespan of the image display apparatus 100 including the organic light emitting diode panel 210 may be increased.

The signal processor 270 may perform control to apply a lower data voltage than an allocated data voltage to the subpixel of the calculated burn-in subpixel or burn-in expected subpixel.

When burn-in does not occur in the organic light emitting diode panel 210, the signal processor 270 may perform control to allow a larger amount of current than allocated current to flow in the burn-in expected subpixel, in which burn-in is expected, and thus, burn-in of the subpixel around the burn-in expected subpixel may be extended. As a result, the lifespan of the image display apparatus 100 including the organic light emitting diode panel 210 may be increased.

The signal processor 270 may perform control to allow current of a higher second level than a first level to flow in the subpixel around the calculated burn-in subpixel or burn-in expected subpixel, and thus, a larger amount of current may flow in the second subpixel, the lifespan of which is expected to be relatively long, thereby preventing brightness from being lowered.

The signal processor 270 may calculate a subpixel with the largest amount of accumulated current in the organic light emitting diode panel 210 based on current detected by the current detector 1110 and may perform control to allow a lower amount of current than allocated current to flow in a subpixel around the subpixel with the largest amount of accumulated current. Thus, the lifespan of the image display apparatus 100 including the organic light emitting diode panel 210 may be increased.

The signal processor 270 may perform control to allow current of a further lowered level to flow in a subpixel around the subpixel with the largest amount of accumulated current toward the subpixel with the largest amount of accumulated current, and thus, the lifespan of the image display apparatus 100 including the organic light emitting diode panel 210 may be increased.

An operation of the signal processor 270 or the like will be described in more detail with reference to FIG. 9 and subsequent drawings thereof.

Figure 6A:
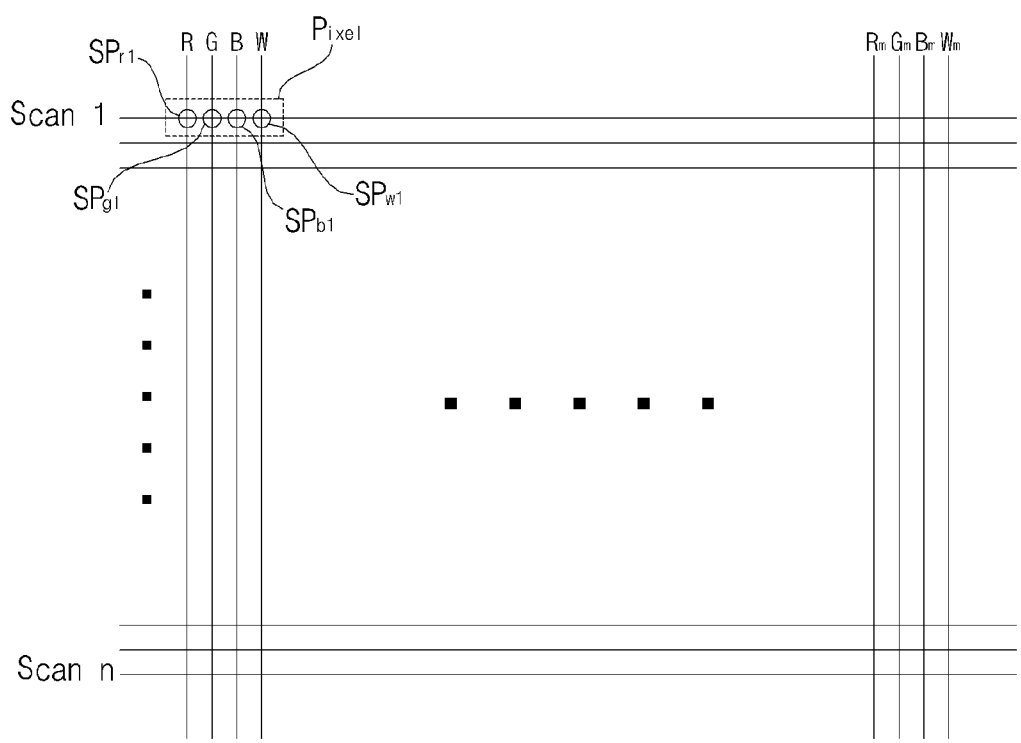
FIG. 6A and FIG. 6B are diagrams referred to in the description of an organic light emitting diode panel of FIG. 5.
Figure 6B:
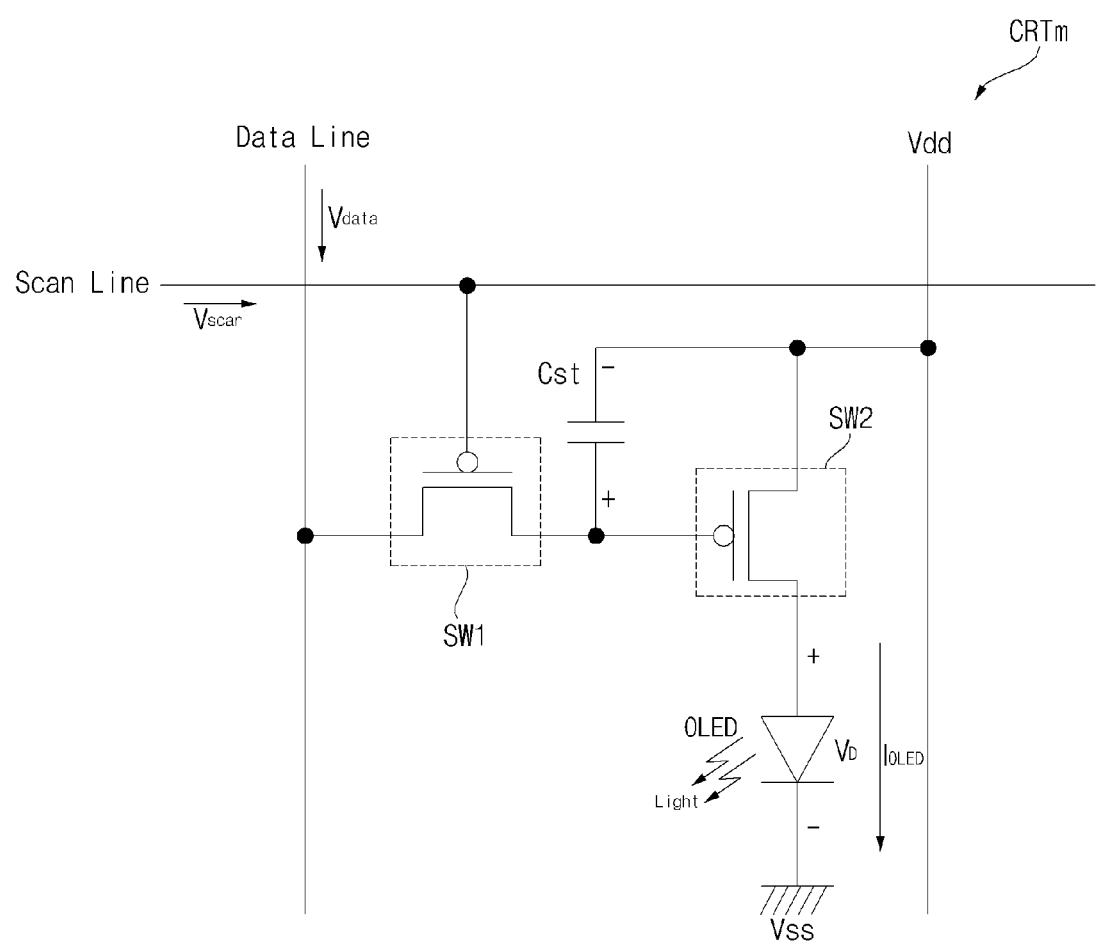

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to $R_m$, $G_m$, $B_m$, $W_m$ intersecting the scan lines.

Meanwhile, a pixel (subpixel) is defined in an intersecting area of the scan line and the data line in the organic light emitting diode panel 210. In the drawing, a pixel including subpixels SR1, SG1, SB1 and SW1 of RGBW is shown.

FIG. 6B illustrates a circuit of any one subpixel in the pixel of the organic light emitting diode panel of FIG. 6A.

Referring to drawing, an organic light emitting sub pixel circuit (CRTm) may include, as an active type, a switching transistor SW1, a storage capacitor Cst, a drive transistor SW2, and an organic light emitting layer (OLED).

The switching transistor SW1 is turned on according to the input scan signal Vdscan, as a scan line is connected to a gate terminal. When it is turned on, the input data signal $V_{data}$ is transferred to the gate terminal of the drive transistor SW2 or one end of the storage capacitor Cst.

The storage capacitor Cst is formed between the gate terminal and the source terminal of the drive transistor SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal $V_{data}$.

For another example, when the data signal has a different pulse width according to a Pulse Width Modulation (PWM) method, the power level stored in the storage capacitor Cst varies according to the pulse width difference of the data signal $V_{data}$.

The drive transistor SW2 is turned on according to the power level stored in the storage capacitor Cst. When the drive transistor SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for the switching transistor SW1 and the drive transistor SW2, but an n-type MOSFET or other switching element such as a JFET, IGBT, SIC, or the like are also available.

Meanwhile, the pixel is a hold type element that continuously emits light in the organic light emitting layer (OLED), after a scan signal is applied, during a unit display period, specifically, during a unit frame.

As current flows in the organic light emitting layer (OLED) arranged in each subpixel shown in FIG. 6B, light may be mitted, but burn-in may occur due to accumulated current. Burn-in will be described with reference to FIGS. 7A to 8B.

FIGS. 7A to 8B are diagrams for explaining burn-in in an image display apparatus included in an organic light emitting diode panel.

Figure 7A:
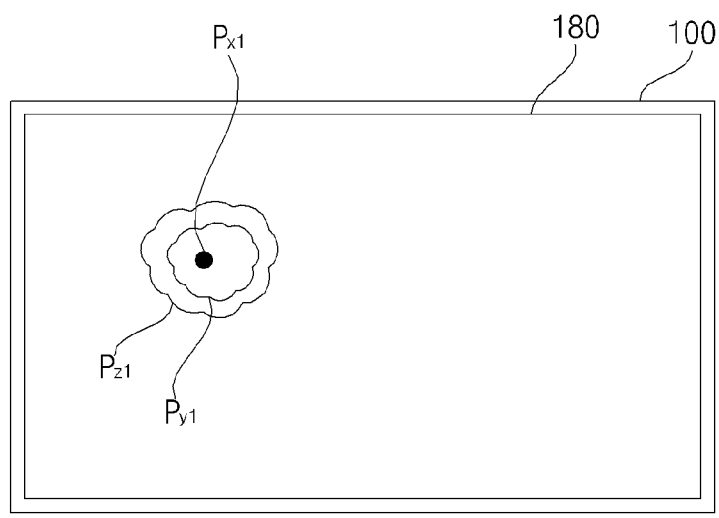
FIGS. 7A to 8B are diagrams for explaining burn-in in an image display apparatus included in an organic light emitting diode panel.

First, referring to FIG. 7A, when accumulated current flowing in a first point $P_{x1}$ of the display 180 of the image display apparatus 100 is equal to or greater than an allowable value, as described above, burn-in may occur due to consumption of the organic light emitting layer (OLED).

The possibility of burn-in in a second pixel Oy1 and a third region $P_{z1}$ which are around the first point $P_{x1}$ may also high.

Figure 7B:
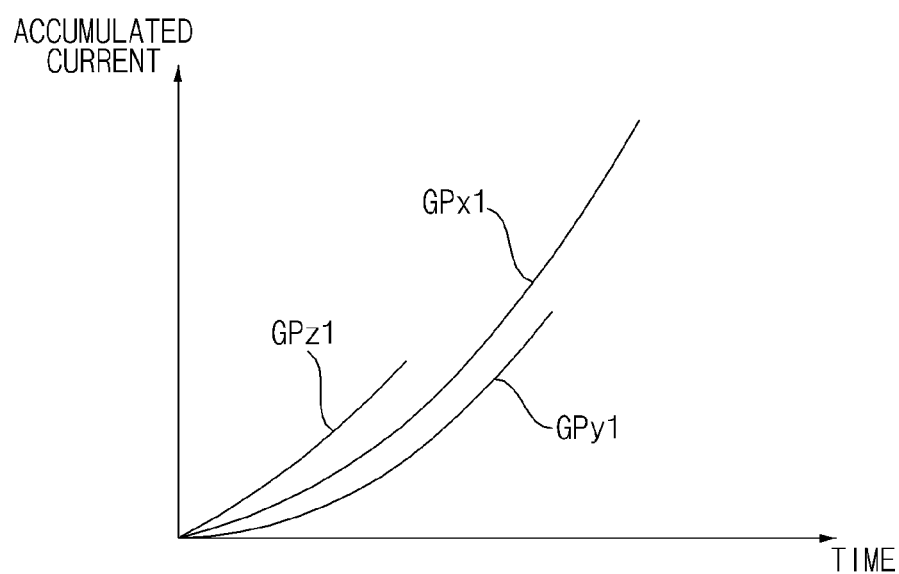

FIG. 7B shows a graph of accumulated current plots GPx1, GPy1, □and GPz1 for the first point $P_{x1}$, the second pixel Oy1, and the third region $P_{z1}$, respectively.

Figure 8A:
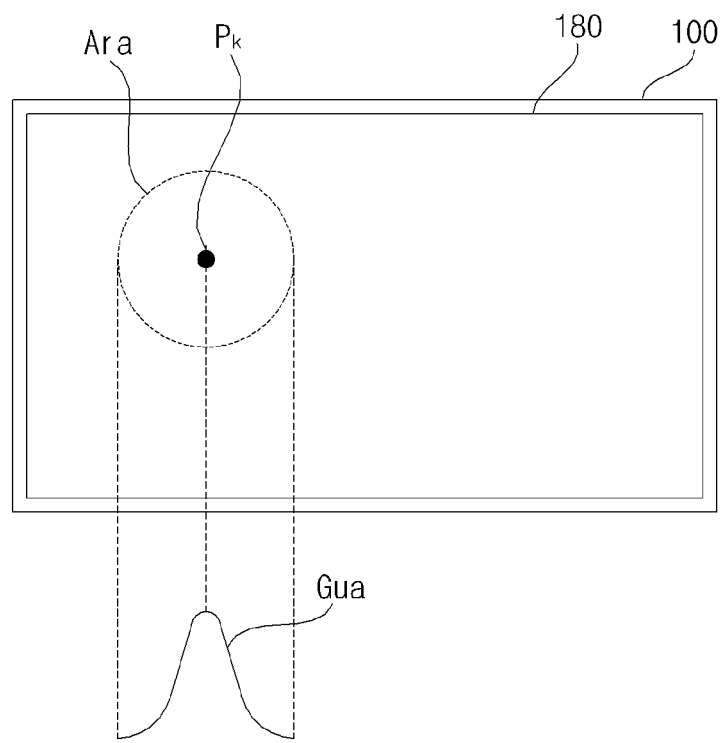

FIG. 8A shows burn-in possibility of Gaussian distribution with respect to area Ara including a burn-in point $P_k$.

Figure 8B:
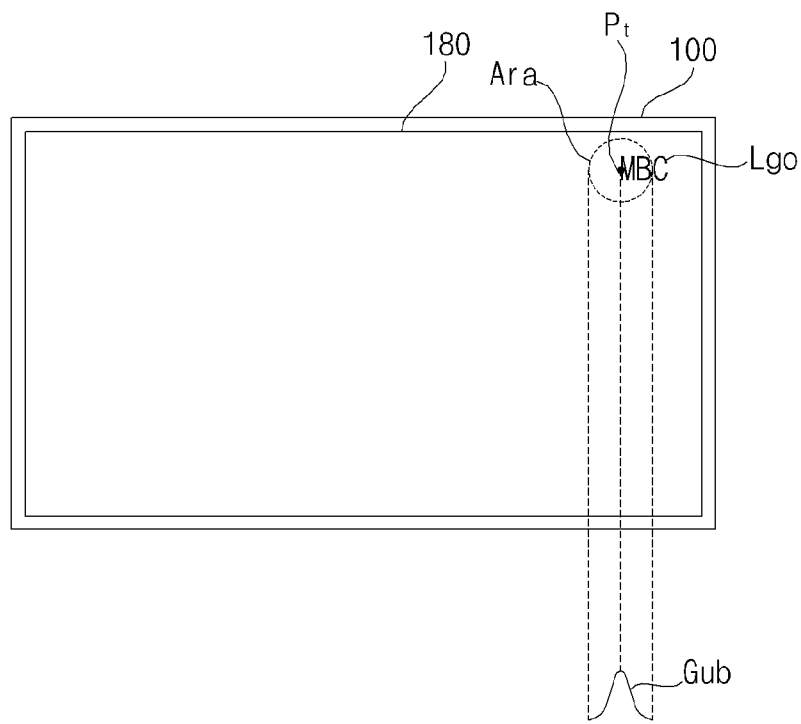

FIG. 8B shows burn-in possibility of Gaussian distribution with respect to area Ara including a burn-in point Pt at which a logo is indicated.

As shown in FIGS. 8A and 8B, burn-in possibility has Gaussian distribution based on a burn-in point, and thus, the present disclosure proposes a method of increasing the lifespan of an organic light emitting diode panel by lowering burn-in possibility around a burn-in point, which will be described with reference to FIG. 9, etc.

Figure 9:
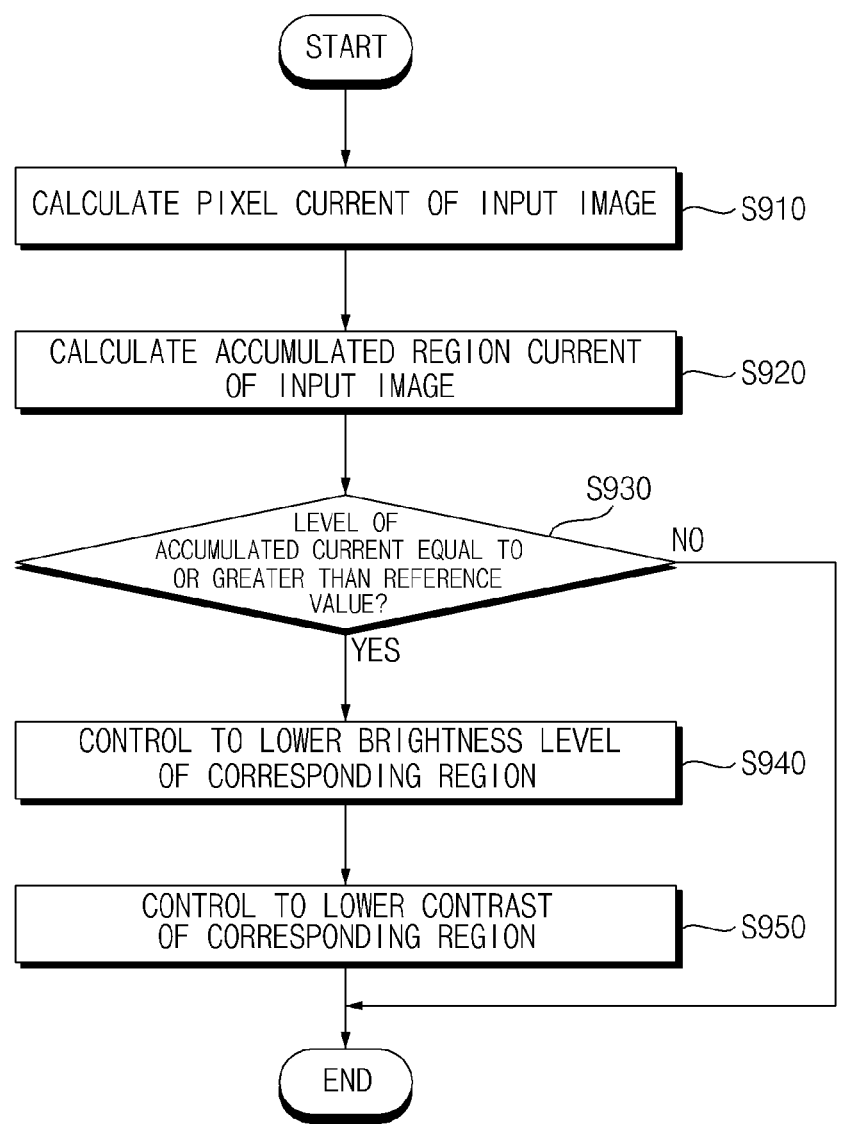
FIG. 9 is a flowchart showing a method of operating a signal processing device according to an embodiment of the present disclosure.

FIG. 9 is a flowchart showing an example of an operating method of an image display apparatus according to an embodiment of the present disclosure.

Referring to the drawing, a signal processor 1000 in the image display apparatus 100 may calculate pixel current of an input image (S910).

For example, the current calculator 1010 in the signal processor 1000 may predict and calculate subpixel current of subpixels based on pixel data of the input image, may sum the calculated subpixel current, and may output predicted pixel current in units of pixels. Thus, the predicted pixel current may be accurately calculated.

Then, the signal processor 1000 in the image display apparatus 100 may calculate the accumulated current of the input image (S920).

For example, the accumulated current calculator 1020 in the signal processor 1000 may accumulate the predicted pixel current from the current calculator 1010 and may predict and calculate the accumulated current of regions including pixels. Thus, the accumulated region current may be accurately predicted and calculated.

Compared with calculation of current in units of pixels, computational load when accumulated current is calculated of regions may be low. Thus, the accumulated current may be rapidly calculated of regions.

Then, the signal processor 1000 in the image display apparatus 100 may determine whether a level of accumulated current is equal to or greater than a reference value (S930), and when the level of accumulated current is equal to or greater than the reference value, the signal processor 1000 may output a second brightness level that is lower than the brightness level☐ of the input image with respect to a detection region (S940).

For example, when a level of accumulated current is equal to or greater than a reference value, the afterimage reducer 1040 in the signal processor 1000 may extract a corresponding region as a detection region and may perform afterimage reduction processing in pixel units on the extracted detection region.

In detail, the afterimage reducer 1040 in the signal processor 1000 may output a second brightness level that is lower than a brightness level of an input image in units of pixels on the detection region. Thus, it may be possible to perform afterimage reduction processing in units of pixels.

Here, the reference value may be described in various ways, but for example, may be 300,000 A. That is, when the reference value is 300,000 A, a corresponding region may be determined as a burn-in region and a pixel in the corresponding region may be determined as a burn-in pixel.

Then, the signal processor 1000 in the image display apparatus 100 may vary contrast to reduce a difference of the detection region from a region around (S950).

For example, the afterimage reducer 1040 in the signal processor 1000 may vary contrast to reduce a difference of the detection region from a region around. Thus, the contrast difference due to reduction in brightness around the detection region may be lowered.

In more detail, the afterimage reducer 1040 in the signal processor 1000 may reduce a contrast difference between a detection region and a surrounding region around based on a gain corresponding to accumulated pixel current. Thus, the contrast difference due to reduction in brightness around the detection region may be lowered. In addition, burn-in that occurs around the detection region may be prevented.

Figure 10:
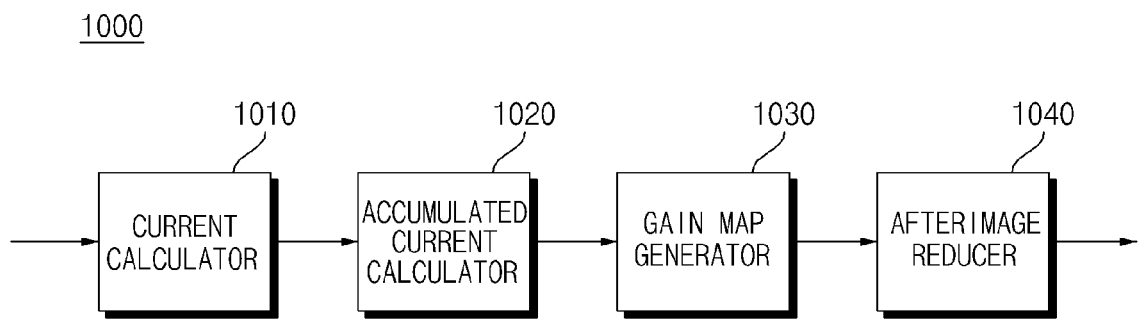
FIG. 10 is an example of an internal block diagram of a signal processing device according to an embodiment of the present disclosure.

FIG. 10 is a flowchart showing an example of a signal processor according to an embodiment of the present disclosure. FIGS. 11 to 20C are diagrams for explaining FIG. 9 or 10.

First, referring to FIG. 10, the signal processor 1000 according to an embodiment of the present disclosure may correspond to the signal processor 170 of FIG. 2.

The signal processor 1000 according to an embodiment of the present disclosure may include the current calculator 1010, the accumulated current calculator 1020, a gain map generator 1030, and the afterimage reducer 1040.

The current calculator 1010 may calculate pixel current of an input image.

The current calculator 1010 may calculate subpixel current of subpixels, may sum the subpixel current, and may output pixel current. Thus, pixel current may be accurately performed, which will be described with reference to FIG. 11.

Figure 11:
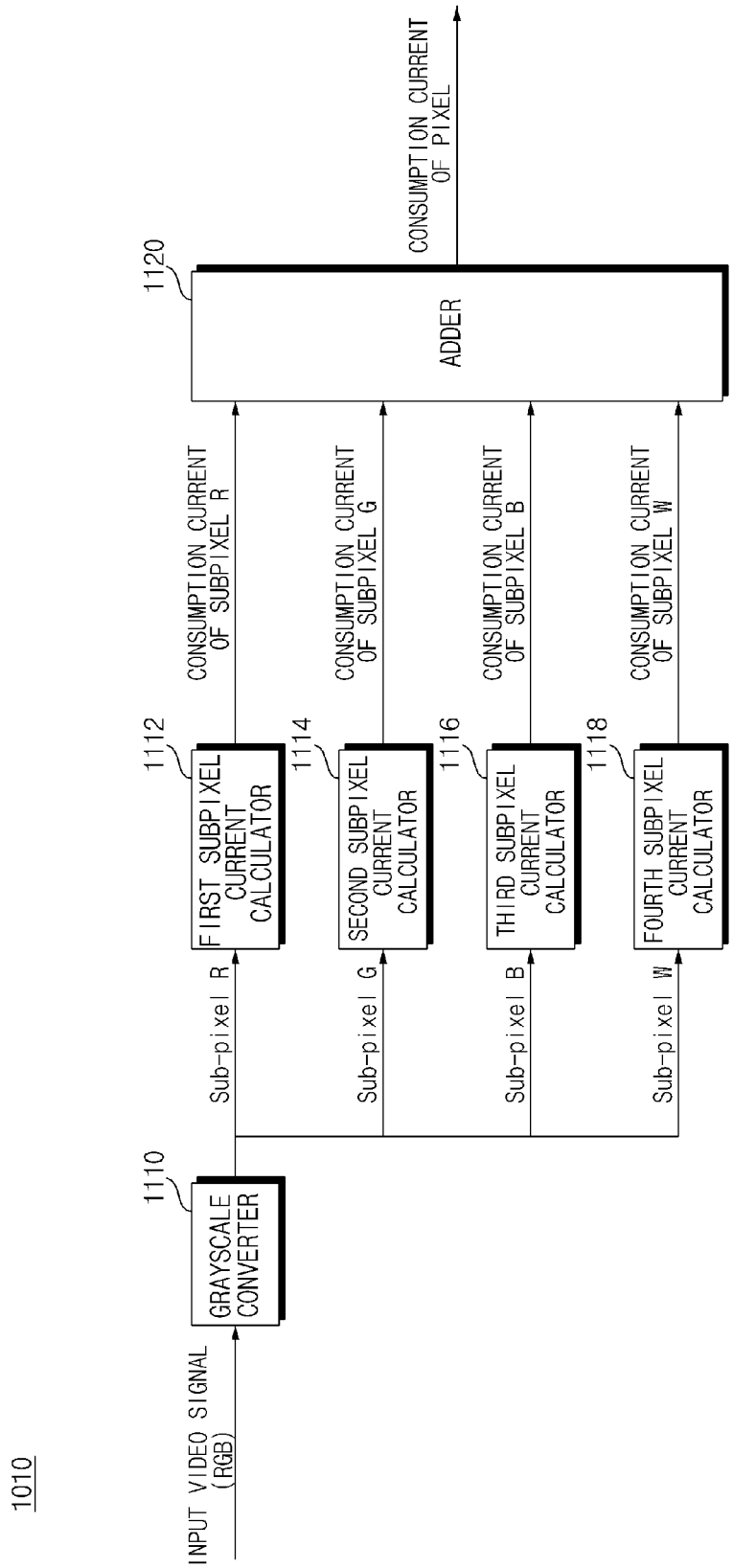
FIGS. 11 to 20C are diagrams for explaining FIG. 9 or 10.

FIG. 11 is an internal block diagram of an example of a current calculator.

Referring to the drawing, the current calculator 1010 may include a grayscale converter 1110, a plurality of subpixel current calculators 1112, 1114, 1116, and 1118, and an adder 1120. Thus, current may be calculated in units of pixels.

The grayscale converter 1110 may convert input image data into grayscale data.

For example, the grayscale converter 1110 may convert RGB data of the input image into a plurality of pieces of subpixel data.

When the display 180 includes RGBW subpixels, the grayscale converter 1110 may convert grayscale of RGB data of the input image into RGBW subpixel data.

The plurality of subpixel current calculators 1112, 1114, 1116, and 1118 may calculate subpixel current of subpixel data from the grayscale converter 1110.

The first subpixel current calculator 1112 may predict and calculate consumption current of an R subpixel based on the R subpixel data from the grayscale converter 1110.

The second subpixel current calculator 1114 may predict and calculate consumption current of a G subpixel based on the G subpixel data from the grayscale converter 1110.

The third subpixel current calculator 1116 may predict and calculate consumption current of a B subpixel based on the B subpixel data from the grayscale converter 1110.

The fourth subpixel current calculator 1118 may predict and calculate consumption current of a W subpixel based on the W subpixel data from the grayscale converter 1110.

The plurality of subpixel current calculators 1112, 1114, 1116, and 1118 may predict and calculate consumption consumed by each subpixel by multiplying each subpixel data or grayscale data of each subpixel by each gain.

The adder 1120 may output pixel current by adding subpixel current from the plurality of subpixel current calculators 1112, 1114, 1116, and 1118.

The accumulated current calculator 1020 may calculate accumulated current of an input image. For example, the accumulated current calculator 1020 may predict and calculate accumulated current of regions in the input image.

In detail, the accumulated current calculator 1020 may accumulate pixel current from the current calculator 1010 and may calculate accumulated current of regions including pixels. Thus, accumulated current of regions may be accurately performed, which will be described with reference to FIG. 12.

Figure 12:
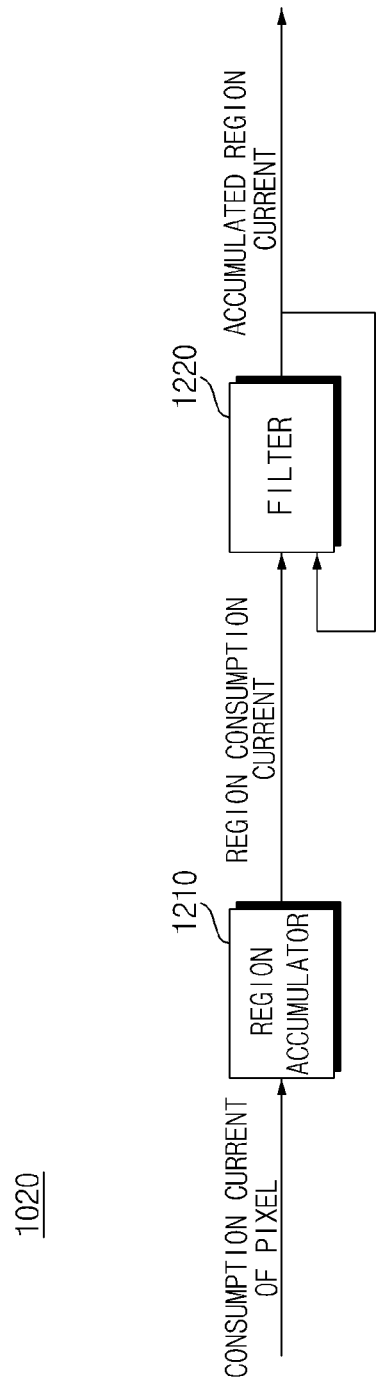

FIG. 12 is an internal block diagram of an example of an accumulated current calculator.

Referring to the drawing, the accumulated current calculator 1020 may include a region accumulator 1210 for calculating consumption current for a region based on consumption current of pixels from the current calculator 1010, and a filter 1220 for calculating accumulated current for each region based on the calculated consumption for a region for removing temporal noise.

Temporal or spatial noise or error may occur in consumption current of pixel.

Thus, according to the present disclosure, a robust and high current consumption region may be calculated without being affected by such noise.

That is, in order to remove spatial noise, the region accumulator 1210 in the accumulated current calculator 1020 may partition the entire region into several regions, may accumulate consumption current of all pixels in each region, and may calculate region consumption current.

In order to remove temporal noise, the filter 1220 in the accumulated current calculator 1020 may filter region consumption current output from the region accumulator 1210 through an IIR filter, may accumulate current values, and may calculate accumulated region current.

The gain map generator 1030 may generate a gain map including a gain that is set based on the accumulated current. Thus, an afterimage may be reduced based on the gain.

The gain map generator 1030 may set the gain based on the accumulated region current and may generate the gain map based on the set gain, which will be described with reference to FIG. 13.

Figure 13:
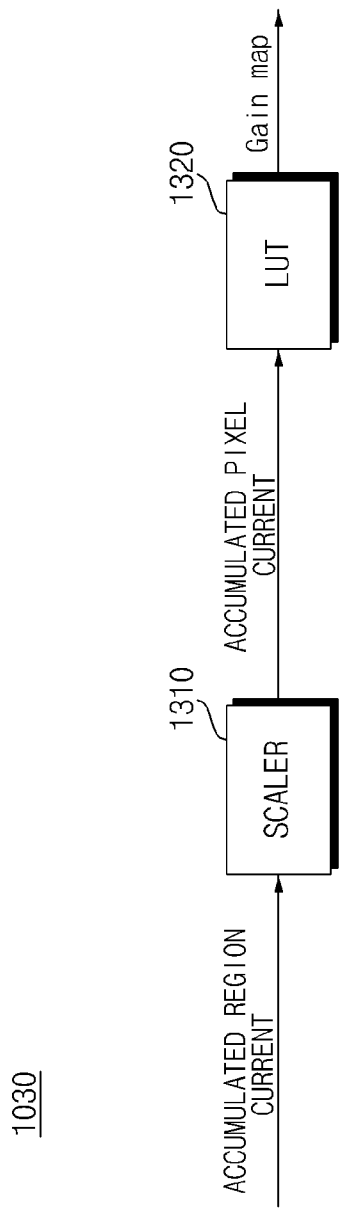

FIG. 13 is an internal block diagram of a gain map generator.

The gain map generator 1030 may include a scaler 1310 and a lookup table (LUT).

When afterimage reduction processing is performed on a region in which a large amount of current is consumed, it may be important to perform processing to prevent sense of difference between a detection region detected for processing an afterimage and a surrounding region around the detection region.

Thus, the scaler 1310 may upscale accumulated region current to accumulated pixel current.

That is, the scaler 1310 may upscale a region high-current consumption map to the entire image resolution and may smoothly change a current value around a boundary around the detection region.

The scaler 1310 may perform upscaling to decrease a current difference between the detection region and the surrounding region around pixels compared with a difference between regions. Thus, the calculated current difference between the detection region and the surrounding region around may be smoothly changed.

The lookup table (LUT) may set a gain for processing the afterimage in response to accumulated pixel current.

The gain map generator 1030 may generate a gain map for each pixel based on the set gain.

Figure 14:
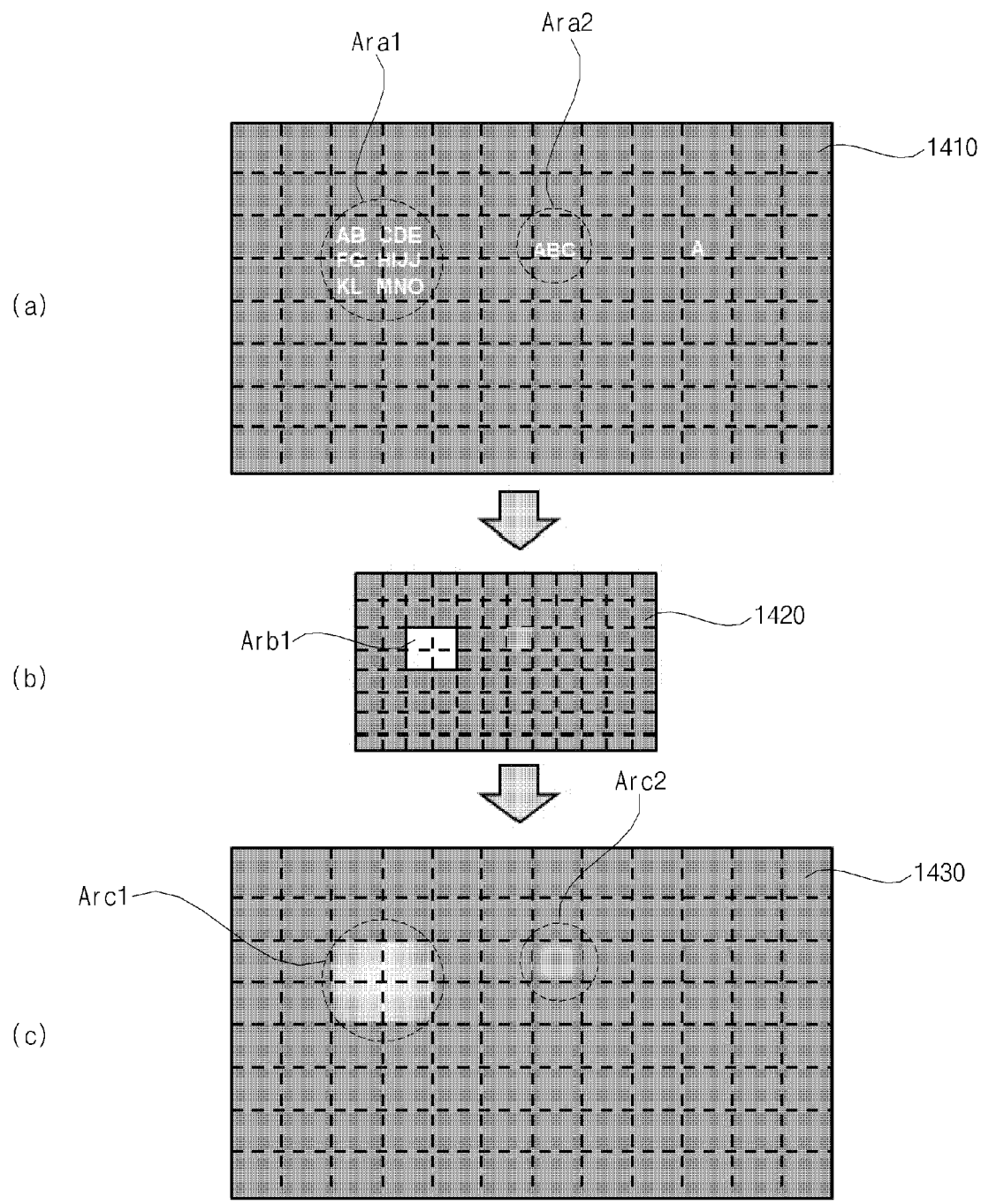

FIG. 14 shows an example in which a pixel-unit calculation current map 1410 is converted into a accumulated region current calculation map 1420, the accumulated region current calculation map 1420 is upscaled by the scaler 1310, and a accumulated pixel current calculation map 1430 corresponding to the entire image resolution may be generated.

Referring to the drawing, some regions Ara1 and Ara2 in the calculation current map 1410 may be converted and may be clearly indicated as some regions Arb1 and Arb2 in the accumulated region current calculation map 1420, thereby causing sense of difference from a surrounding region.

As shown in FIG. 14C, a boundary of regions Arc1 and Arc2 in the accumulated pixel current calculation map 1430 may be smoothly changed through upscaling by the scaler 1310. Thus, sense of difference from a surrounding region may be reduced.

When a level of accumulated current is equal to or greater than a reference value, the afterimage reducer 1040 may detect a corresponding region as a detection region or an afterimage processing region and may output a second brightness level less than a brightness level of the input image with respect to the detection region. Thus, the lifespan of the image display apparatus including an organic light emitting diode panel may be increased.

According to such a method, it may be possible to detect a translucent logo region, which is originally difficult to be detected, as a detection region using a logo detection method, and thus, an operation of reducing an afterimage may be widely and accurately performed, thereby increasing the lifespan of the image display apparatus. A brightness level in units of pixels in a detection region may be lowered, and thus, the brightness of the entire image may be enhanced compared with the prior art, which will be described with reference to FIG. 15.

Figure 15:
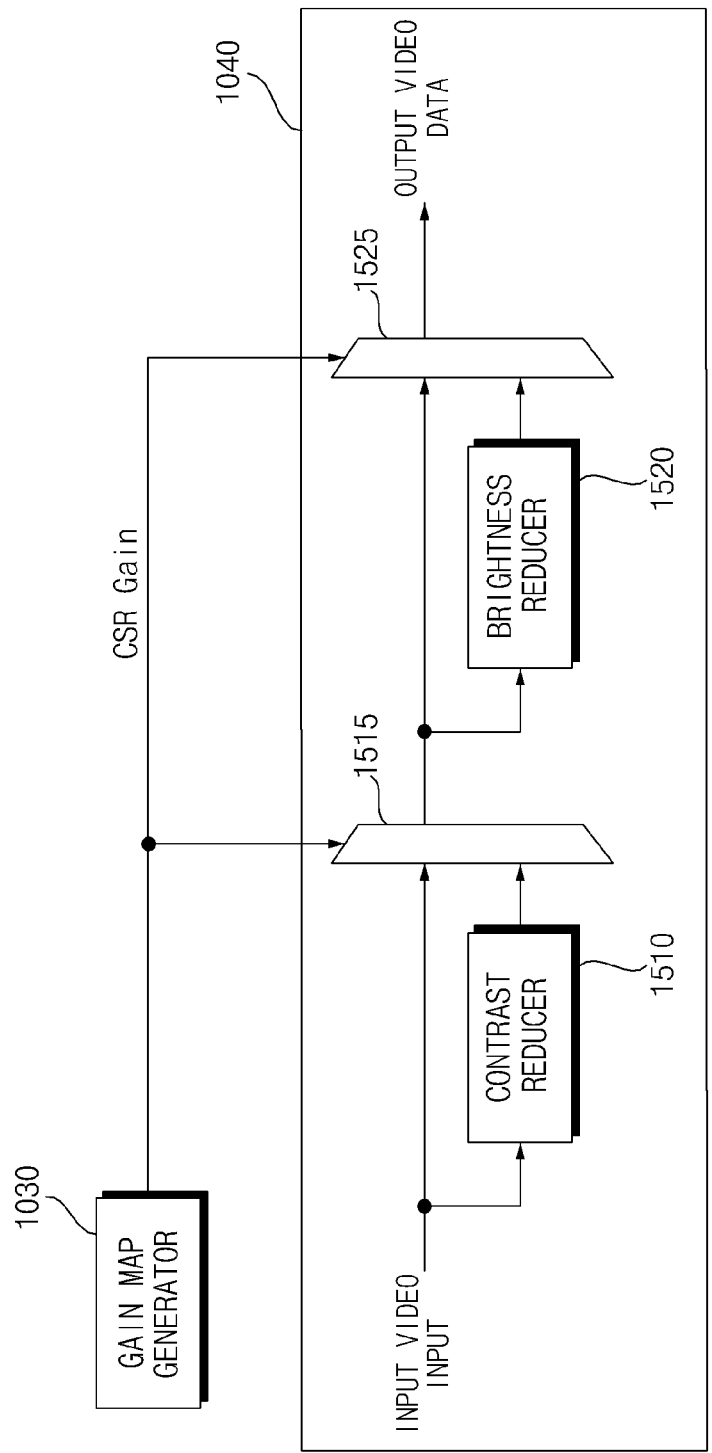

FIG. 15 is an internal block diagram of an afterimage reducer.

Referring to the drawing, the afterimage reducer 1040 may include a brightness reducer 1520 and a contrast reducer 1510.

The afterimage reducer 1040 may vary the brightness and contrast of a detection region of the input image based on a gain in a gain map. Thus, the lifespan of an image display apparatus of an organic light emitting diode panel may be increased. In particular, a translucent logo region may be detected and an operation of reducing an afterimage may be performed, thereby increasing the lifespan of an image display apparatus.

The afterimage reducer 1040 may vary the brightness and contrast of a detection region of an input image in inverse proportion to the gain of the gain map. Thus, the lifespan of the image display apparatus including the organic light emitting diode panel may be increased. In particular, a translucent logo region may be detected and an operation of reducing an afterimage may be performed, thereby increasing the lifespan of an image display apparatus.

The brightness reducer 1520 may reduce the brightness of a detection region based on a gain corresponding to accumulated pixel current.

For example, the brightness reducer 1520 may vary the brightness of a detection region of the input image in inverse proportion to the gain of the gain map.

In detail, the brightness reducer 1520 may output brightness data of a lower second level than a brightness level of a detection region of the input image based on the gain of the gain map.

Thus, the lifespan of an image display apparatus including an organic light emitting diode panel may be increased. In particular, a translucent logo region may be detected and an operation of reducing an afterimage may be performed, thereby increasing the lifespan of the image display apparatus.

The contrast reducer 1510 may vary contrast to reduce a difference from a surrounding region of the detection region. Thus, the contrast difference due to reduction in brightness around the detection region may be lowered.

For example, the contrast reducer 1510 may reduce a contrast difference between a detection region and a surrounding region around based on a gain corresponding to accumulated pixel current. Thus, the contrast difference due to reduction in brightness around the detection region may be lowered.

Figure 17:
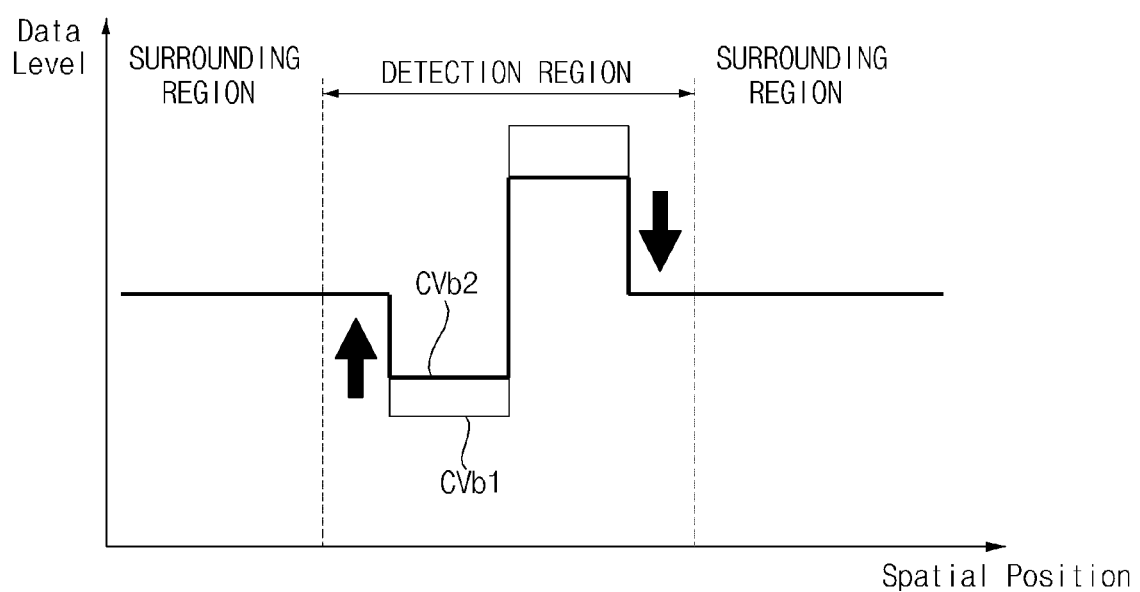

FIG. 17 illustrates an input brightness plot CVb1 and an output brightness plot CVb1.

Referring to the drawing, when a brightness level in a detection region is lower than a brightness level of a surrounding region, the contrast reducer 1510 may increase a brightness level in the detection region in order to reduce a contrast difference, as shown in the drawing. In this case, the increased brightness level may be lower than the brightness level of the surrounding region. Thus, a darker detection region than the surrounding region may become bright.

When a brightness level in a detection region is higher than a brightness level of a surrounding region, the contrast reducer 1510 may reduce a brightness level in the detection region in order to reduce a contrast difference, as shown in the drawing. In this case, the reduced brightness level may be higher than a brightness level☐ of a surrounding region. Thus, a brighter detection region than the surrounding region may become dark. As a result, the contrast difference due to reduction in brightness around the detection region may be lowered.

The detection region may include a translucent logo region or a text region, and the afterimage reducer 1040 may perform control the brightness of a detection region to be lower than the input image. Thus, the lifespan of an image display apparatus including an organic light emitting diode panel may be increased. In particular, a translucent logo region may be detected and an operation of reducing an afterimage may be performed, thereby increasing the lifespan of the image display apparatus.

The brightness reducer 1520 in the afterimage reducer 1040 may perform to decrease the brightness of a surrounding region around the detection region compared with the input image. Thus, the lifespan of an image display apparatus including an organic light emitting diode panel may be increased. In particular, a translucent logo region may be detected and an operation of reducing an afterimage may be performed, thereby increasing the lifespan of the image display apparatus.

As shown in the drawing, the afterimage reducer 1040 may further include a first multiplexer 1515 for outputting data of output and the input image of the contrast reducer 1510, and a second multiplexer 1525 for outputting data of output and the input image of the brightness reducer 1520.

The contrast reducer 1510 in the afterimage reducer 1040 may first perform contrast reduction, and then, the brightness reducer 1520 may perform brightness reduction based on brightness data with reduced contrast, data of the input image, and a gain from a gain map.

Figure 16:
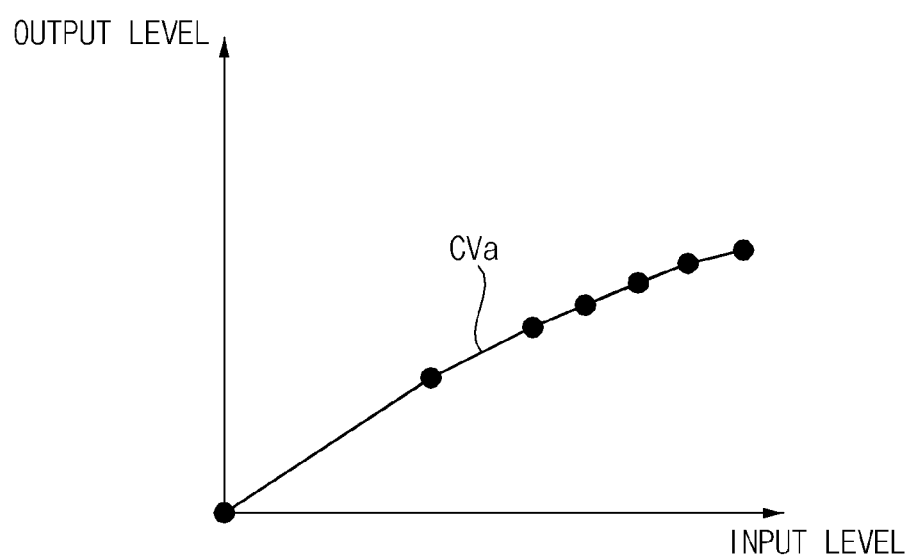

As shown in FIG. 16, the brightness reducer 1520 in the afterimage reducer 1040 may perform control to increase an inclination as an input brightness level is lowered and to reduce the inclination as the input brightness level is increased compared with a brightness level of the input image in a plot CVa of the second brightness level. Thus, the lifespan of an image display apparatus including an organic light emitting diode panel may be increased. In particular, a translucent logo region may be detected and an operation of reducing an afterimage may be performed, thereby increasing the lifespan of the image display apparatus.

The brightness reducer 1520 in the afterimage reducer 1040 may perform control to reduce a difference between the brightness level and the second brightness level of the input image as a brightness level of the input image corresponding to a detection region is lowered and may perform control to increase a difference between the brightness level and the second brightness level of the input image as the brightness level of the input image corresponding to the detection region increases.

Figure 18:
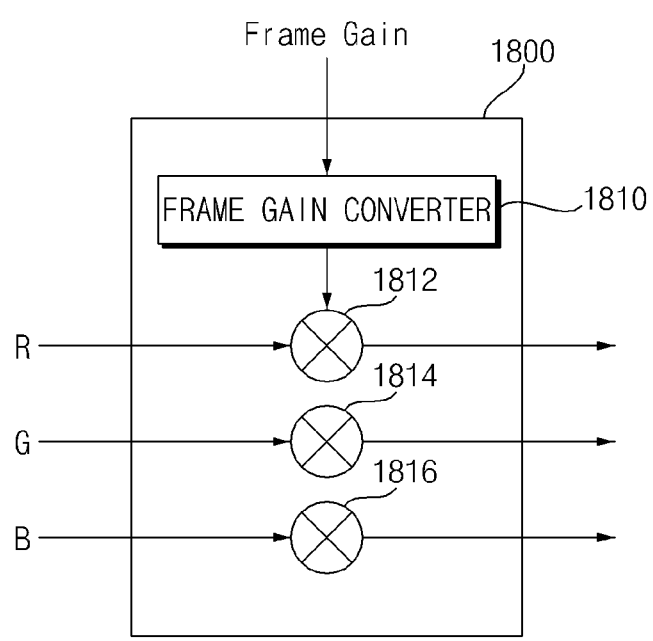

FIG. 18 is a diagram showing an example in which an afterimage reducer 1800 reduces a brightness level of RGB data using a frame gain converter 1810.

Referring to the drawing, the drawing illustrates an example in which the afterimage reducer 1800 performs the same brightness reduction as RGB data in inverse proportion to a frame gain of the frame gain converter 1810.

Thus, the same brightness reduction may be performed for respective pixels, and thus, brightness reduction based on a difference for each subpixel may not be performed. That is, burn-in reduction for each subpixel may not be performed.

Accordingly, according to the present disclosure, a gain for each subpixel may be varied and burn-in reduction may be performed, which will be described with reference to FIG. 19.

Figure 19:
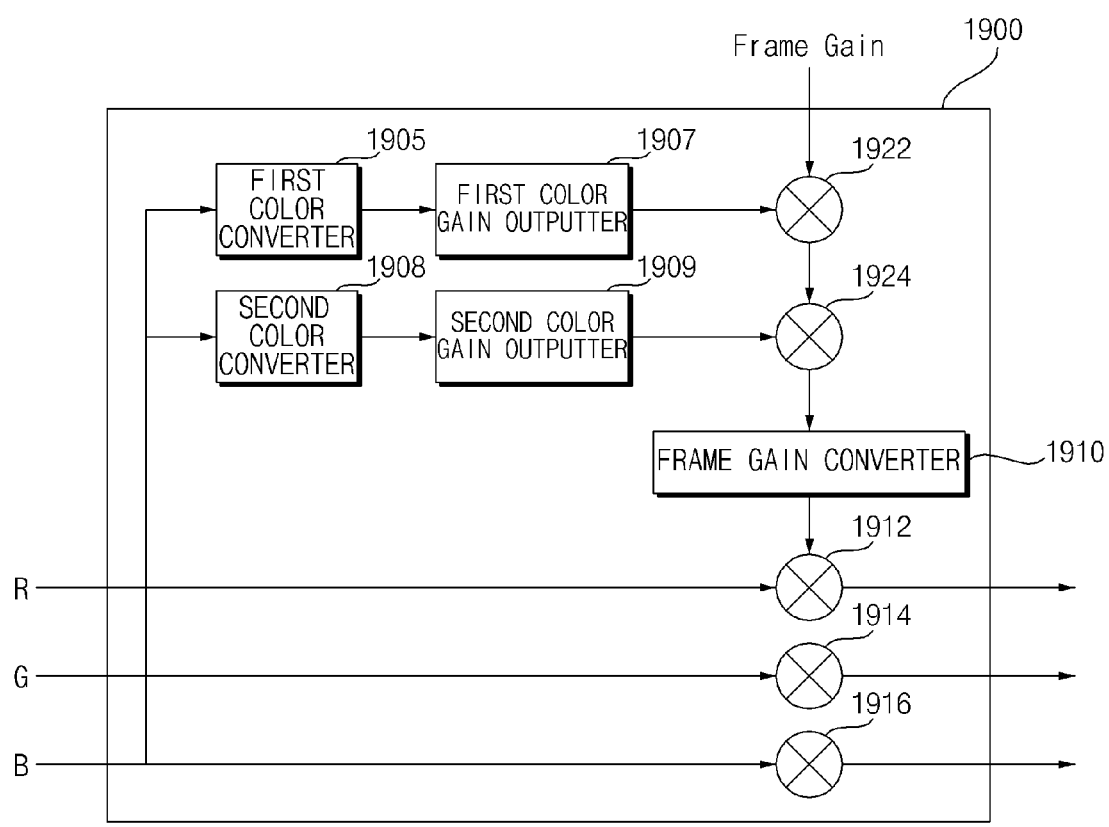

FIG. 19 is a diagram showing an example in which an afterimage reducer 1900 reduces a brightness level of RGB data using a frame gain converter 1910, a plurality of color converters 1905 and 1908, and a plurality of color gain outputters 1907 and 1909.

Referring to the drawing, the afterimage reducer 1900 may vary brightness in a detection region using a gain for each subpixel of an input image and a frame gain. Thus, the lifespan of an image display apparatus including an organic light emitting diode panel may be increased. In particular, a translucent logo region may be detected and an operation of reducing an afterimage may be performed, thereby increasing the lifespan of the image display apparatus.

The plurality of color converters 1905 and 1908 may convert input RGB data into V and Sdata of HSV data.

The plurality of color gain outputters 1907 and 1909 may output a gain corresponding to each of V and Sdata output from the plurality of color converters 1905 and 1908.

A brightness level may be varied based on a gain corresponding to each of V and Sdata and an inversely proportional value of a frame gain output from a frame gain converter 1914.

That is, the afterimage reducer 1900 may output brightness data with reduced brightness for each subpixel compared with a brightness level of input RGB data based on an inversely proportional value of a frame gain. Thus, brightness reduction for each subpixel may be performed, and thus, burn-in reduction for each subpixel may be performed.

In the method for reducing the afterimage described with reference to FIGS. 9 to 19, when a level of accumulated current is equal to or greater than a reference value, a corresponding region may be extracted as a detection region for reducing an afterimage, and thus, the method may be different from a method of searching for a logo based on a difference between a previous frame and a current frame.

That is, in the method for reducing the afterimage described with reference to FIGS. 9 to 19, a current value may be predicted and processed from a gray value of an input image, and thus, a translucent logo region and a transparent text region as well as a transparent logo region and a transparent text region may be extracted as a detection region, and thus, an operation of reducing an afterimage may be widely and accurately performed.

In the method for reducing the afterimage described with reference to FIGS. 9 to 19, accumulated current may be calculated for each region and may be upscaled in units of pixels, and thus, it may be possible to reduce an after image to remove sense of difference from a surrounding region without being affected by temporal and spatial noise.

In the method for reducing the afterimage described with reference to FIGS. 9 to 19, a region in which much current is predicted to be consumed to prevent an afterimage and reduction in an afterimage may be applied only a region around the detection region, and thus, it may be possible to maintain brightness with respect to a surrounding moving region in which an afterimage is not generated, and the brightness of the organic light emitting diode panel may be advantageously increased to the maximum.

In the method for reducing the afterimage described with reference to FIGS. 9 to 19, input image data may be advantageously changed to prevent an afterimage without change of a timing controller 232.

The method for reducing the afterimage described with reference to FIGS. 9 to 19 may be embodied in the signal processor 170 of FIG. 2 and consumption current flowing in a pixel of the display 180 may be predicted based on a data signal of the input image without detection of current flowing in the display 180, and thus an afterimage may be advantageously prevented by changing input image data without change of the timing controller 232.

Figure 20A:

FIG. 20A is diagram showing an example of an image 2010 including a text region 2015.

Figure 20B:
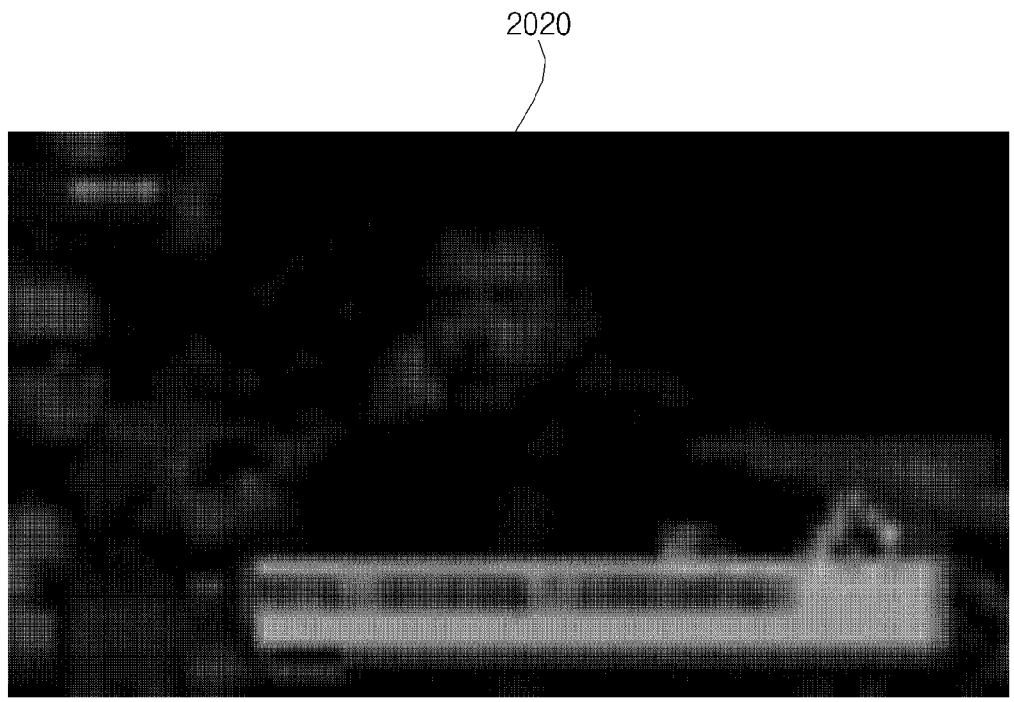
Figure 20C:

In the method for reducing the afterimage described with reference to FIGS. 9 to 19, a gain map 2020 shown in FIG. 20B may be generated and afterimage processing may be performed based on a gain for each pixel of the gain map 2020, and thus, as shown in FIG. 20C, an image 2030 including a text region 2035 may be output.

It may be seen that, compared with FIG. 20A, brightness reduction processing, contrast reducing processing, or the like may be performed on the text region 2035 of the image 2030 of FIG. 20C, and thus, the brightness thereof may be maintained, and simultaneously, contrast may be reduced. In addition, the lifespan of the corresponding region 2035 may be increased through processing for preventing afterimage reduction.

According to an embodiment of the present disclosure, a signal processing device and an image display apparatus including the same may include a current calculator for calculating pixel current of an input image, an accumulated current calculator for calculating accumulated current of the input image, and an afterimage reducer for outputting a second brightness level less than a brightness level of the input image with respect to the detection region if a level of the accumulated current is equal to or greater than a reference value. Thus, the lifespan of an image display apparatus including an organic light emitting diode panel may be increased. In particular, a translucent logo region may be detected and an operation of reducing an afterimage may be performed, thereby increasing the lifespan of the image display apparatus.

A brightness level may be lowered in units of pixels in a detection region, and thus, the brightness of an entire image may be enhanced compared with the prior art.

The current calculator according to an embodiment of the present disclosure may calculate subpixel current of subpixels, may sum the calculated subpixel current, and may output pixel current. Thus, current may be accurately calculated in units of pixels.

The accumulated current calculator according to an embodiment of the present disclosure may accumulate pixel current from the current calculator and may calculate accumulated current of regions including a pixel. Thus, accumulated current may be accurately calculated of regions.

The afterimage reducer according to an embodiment of the present disclosure may vary contrast to reduce a difference from a surrounding region of a detection region. Thus, the contrast difference due to reduction in brightness around the detection region may be lowered.

The signal processing device according to an embodiment of the present disclosure may further include a gain map generator for generating a gain map including a gain set based on accumulated current. Thus, afterimage reduction based on a gain may be performed.

The afterimage reducer according to an embodiment of the present disclosure may vary brightness and contrast of the input image based on the gain in the gain map. Thus, the lifespan of the image display apparatus including the organic light emitting diode panel may be increased. In particular, a translucent logo region may be detected and an operation of reducing an afterimage may be performed, thereby increasing the lifespan of the image display apparatus.

The afterimage reducer according to an embodiment of the present disclosure may vary the brightness and contrast of the input image in inverse proportion to a gain of the gain map. Thus, the lifespan of the image display apparatus including the organic light emitting diode panel may be increased. In particular, a translucent logo region may be detected and an operation of reducing an afterimage may be performed, thereby increasing the lifespan of an image display apparatus.

The current calculator according to an embodiment of the present disclosure may include a grayscale converter for converting input image data into grayscale data, a plurality of subpixel current calculators for calculating subpixel current with respect to subpixel data from the grayscale converter, and an adder for outputting pixel current by adding subpixel current from the subpixel current calculator. Thus, current may be calculated in units of pixels.

The accumulated current calculator according to an embodiment of the present disclosure may include a region accumulator for calculating accumulated region current based on pixel current from the current calculator, and a filter for filtering accumulated current for each region. Thus, spatial noise and temporal noise may be removed.

The gain map generator according to an embodiment of the present disclosure may include a scaler for upscaling accumulated region current to accumulated pixel current in units of pixels. Thus, the calculated current difference between the detection region and the surrounding region around may be smoothly changed.

The gain map generator according to an embodiment of the present disclosure may include a lookup table (LUT) for setting gain corresponding to accumulated pixel current, and the gain map may be generated based on the set gain. Thus, an afterimage may be reduced based on a gain map.

The scaler according to an embodiment of the present disclosure may perform upscaling to decrease a current difference between the detection region and the surrounding region around pixels compared with a difference between regions. Thus, the calculated current difference between the detection region and the surrounding region around may be smoothly changed.

The afterimage reducer according to an embodiment of the present disclosure may include a brightness reducer for reducing the brightness of a detection region based on a gain corresponding to accumulated pixel current. Thus, the lifespan of an image display apparatus including an organic light emitting diode panel may be increased. In particular, a translucent logo region may be detected and an operation of reducing an afterimage may be performed, thereby increasing the lifespan of the image display apparatus.

The afterimage reducer according to an embodiment of the present disclosure may further include a contrast reducer for reducing a contrast difference between a detection region and a surrounding region around based on a gain corresponding to accumulated pixel current. Thus, the contrast difference due to reduction in brightness around the detection region may be lowered.

The detection region may include a translucent logo region or a text region, and the afterimage reducer may perform control to decrease the brightness of the detection region compared with an input image. Thus, the lifespan of the image display apparatus including the organic light emitting diode panel may be increased. In particular, a translucent logo region may be detected and an operation of reducing an afterimage may be performed, thereby increasing the lifespan of the image display apparatus.

The afterimage reducer according to an embodiment of the present disclosure may perform control to decrease the brightness of a surrounding region around the detection region compared with the input image. Thus, the lifespan of an image display apparatus including an organic light emitting diode panel may be increased. In particular, a translucent logo region may be detected and an operation of reducing an afterimage may be performed, thereby increasing the lifespan of the image display apparatus.

The afterimage reducer according to an embodiment of the present disclosure may control to reduce a difference between the brightness level and the second brightness level of the input image as a brightness level of the input image corresponding to a detection region is lowered and may perform control to increase a difference between the brightness level and the second brightness level of the input image as the brightness level of the input image corresponding to the detection region increases.

The afterimage reducer according to an embodiment of the present disclosure may control to increase an inclination as an input brightness level is lowered and to reduce the inclination as the input brightness level is increased compared with a brightness level of the input image in a plot of the second brightness level. Thus, the lifespan of an image display apparatus including an organic light emitting diode panel may be increased. In particular, a translucent logo region may be detected and an operation of reducing an afterimage may be performed, thereby increasing the lifespan of the image display apparatus.

The afterimage reducer according to an embodiment of the present disclosure may vary brightness in a detection region using a gain for each subpixel of an input image and a frame gain. Thus, the lifespan of an image display apparatus including an organic light emitting diode panel may be increased. In particular, a translucent logo region may be detected and an operation of reducing an afterimage may be performed, thereby increasing the lifespan of the image display apparatus.

According to another embodiment of the present disclosure, a signal processing device and an image display apparatus including the same may include a current calculator for calculating pixel current of an input image, an accumulated current calculator for calculating accumulated current of the input image, and an afterimage reducer for varying contrast with respect to the detection region when a level of accumulated current is equal to or greater than a reference value. In addition, the afterimage reducer may perform control to decrease brightness with respect to a brighter first pixel than a surrounding region of the detection region in the detection region and may perform to increase brightness with respect to a darker second pixel than the surrounding region of the detection region in the detection region. Thus, the lifespan of an image display apparatus including an organic light emitting diode panel may be increased. In particular, the contrast difference due to reduction in brightness around the detection region may be lowered.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:
1. A signal processing device comprising:
   a current calculator configured to determine subpixel current for each subpixel of an input image;
   an accumulated current calculator configured to determine accumulated current for each region of the input image based at least in part on the determined subpixel current for each subpixel; and
   an afterimage reducer configured to output an output brightness level for each subpixel less than an input brightness level of the input image with respect to a subpixels based at least in part on a determination that a level of the accumulated current for each subpixel is greater than or equal to a reference value, wherein a difference between the input brightness level and the output brightness level is different for each subpixel.

2. The signal processing device of claim 1, wherein the current calculator is further configured to: add the subpixel current, and output pixel current based at least in part on the added subpixel current.

3. The signal processing device of claim 2, wherein the accumulated current calculator is further configured to accumulate the pixel current from the current calculator and to determine accumulated current of regions including a pixel.

4. The signal processing device of claim 1, wherein the afterimage reducer is further configured to vary contrast to decrease a difference from a surrounding region of a first region.

5. The signal processing device of claim 1, further comprising:
   a gain map generator configured to generate a gain map including a gain set based at least in part on the determined accumulated current for the region from the accumulated current calculator,
   wherein the afterimage reducer is further configured to vary brightness and contrast of the input image based at least in part on the set gain in the gain map.

6. The signal processing device of claim 5, wherein the afterimage reducer is further configured to vary brightness and contrast of the input image in inverse proportion to the set gain of the gain map.

7. The signal processing device of claim 5, wherein the gain map generator comprises a scaler configured to upscale accumulated current for the region to accumulated current for pixel.

8. The signal processing device of claim 7, wherein the gain map generator further comprises a lookup table configured to set a gain corresponding to the accumulated current for pixel; and
   wherein the gain map is generated based at least in part on the set gain.

9. The signal processing device of claim 7, wherein the scaler is further configured to perform the upscaling to decrease a current difference between a first region and a surrounding region around the first region in units of pixels rather than a current difference between the first region and the surrounding region around the first region in units of regions.

10. The signal processing device of claim 1, wherein the current calculator comprises:
    a grayscale converter configured to convert the input image data into grayscale data;
    a plurality of subpixel current calculators configured to determine subpixel current of subpixel data from the grayscale converter; and
    an adder configured to add subpixel current from the plurality of subpixel current calculators and to output pixel current.

11. The signal processing device of claim 1, wherein the accumulated current calculator comprises:

a region accumulator configured to determine consumption current for the region based at least in part on consumption current for pixel from the current calculator; and a filter configured to perform determining the accumulated current for the region based at least in part on the determined consumption current for the region.

12. The signal processing device of claim 1, wherein the afterimage reducer comprises a brightness reducer configured to reduce brightness of a first region based at least in part on a gain corresponding to accumulated current for pixel.

13. The signal processing device of claim 1, wherein the afterimage reducer further comprises a contrast reducer configured to reduce a contrast difference between the first region and a surrounding region around the first region based at least in part on a gain corresponding to accumulated current for pixel.

14. The signal processing device of claim 1, wherein a first region comprises a translucent logo region or a test region; and
wherein the afterimage reducer is configured to perform control to decrease brightness of the first region compared with the input image.

15. The signal processing device of claim 14, wherein the afterimage reducer is configured to perform control to decrease brightness of a surrounding region around the first region compared with the input image.

16. The signal processing device of claim 1, wherein the afterimage reducer is configured to perform control to decrease a difference between a first brightness level of the input image and a second brightness level as a brightness level of the input image corresponding to a first region decreases, and to perform control to increase the difference between the first brightness level of the input image and the second brightness level as the brightness level of the input image corresponding to the first region increases.

17. The signal processing device of claim 1, wherein the afterimage reducer is configured to perform control to increase an inclination as an input brightness level is lowered and to reduce the inclination as the input brightness level is increased compared with a brightness level of the input image in a plot of a second brightness level.

18. The signal processing device of claim 1, wherein the afterimage reducer varies brightness in a first region using a gain for each subpixel of the input image and a frame gain.

19. A signal processing device comprising:
a current calculator configured to determine subpixel current for each subpixel of an input image;
an accumulated current calculator configured to determine accumulated current for each region of the input image based at least in part on the determined subpixel current for each subpixel; and
an afterimage reducer configured to vary contrast with respect to a first region if a level of the accumulated current is equal to or greater than a reference value,
wherein the afterimage reducer performs control to decrease brightness with respect to a first pixel of the first region, which is brighter than the surrounding region of the first region, and performs control to increase brightness with respect to a second pixel of the first region, which is darker than the surrounding region of the first region, wherein a level of brightness decrease in the first pixel is different for each subpixel, wherein a level of brightness increase in the second pixel is different for each subpixel.

20. An image display apparatus comprising:
a display; and
a signal processor configured to output display data on the display,
wherein the signal processor includes:
a current calculator configured to determine subpixel current for each subpixel of an input image;
an accumulated current calculator configured to determine accumulated current for each region of the input image based at least in part on the determined subpixel current for each subpixel; and
an afterimage reducer configured to output an output brightness level for each subpixel less than an input brightness level of the input image with respect to a subpixels based at least in part on a determination that a level of the accumulated current for each subpixel is greater than or equal to a reference value, wherein a difference between the input brightness level and the output brightness level is different for each subpixel.

* * * * *